United States Patent
Hou et al.

(10) Patent No.: US 12,556,915 B2
(45) Date of Patent: Feb. 17, 2026

(54) METHOD, DEVICE AND APPARATUS FOR CONTROLLING NETWORK SLICE AUTHENTICATION, AND RELEVANT STORAGE MEDIUM

(71) Applicant: DATANG MOBILE COMMUNICATIONS EQUIPMENT CO., LTD., Beijing (CN)

(72) Inventors: Yunjing Hou, Beijing (CN); Hucheng Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 282 days.

(21) Appl. No.: 17/915,467

(22) PCT Filed: Mar. 9, 2021

(86) PCT No.: PCT/CN2021/079658
§ 371 (c)(1),
(2) Date: Sep. 28, 2022

(87) PCT Pub. No.: WO2021/203891
PCT Pub. Date: Oct. 14, 2021

(65) Prior Publication Data
US 2023/0144435 A1 May 11, 2023

(30) Foreign Application Priority Data
Apr. 7, 2020 (CN) .......................... 202010264651.7

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0861* (2013.01); *H04L 63/0892* (2013.01); *H04W 12/69* (2021.01); *H04W 48/18* (2013.01)

(58) Field of Classification Search
CPC ..... H04W 12/06; H04W 12/69; H04W 48/18; H04L 63/0892; H04L 63/0861
See application file for complete search history.

(56) References Cited

U.S. PATENT DOCUMENTS

2018/0227873 A1* 8/2018 Vrzic .................. H04W 60/04
2018/0317086 A1* 11/2018 Ben Henda ......... H04W 12/062
(Continued)

FOREIGN PATENT DOCUMENTS

CN 110167025 A 8/2019
CN 110476447 A 11/2019
(Continued)

OTHER PUBLICATIONS

International Search Report for PCT/CN2021/079658 issued on Jun. 1, 2021 and its English Translation provided by WIPO.
(Continued)

*Primary Examiner* — Carl G Colin
*Assistant Examiner* — Zhe Liu
(74) *Attorney, Agent, or Firm* — Ladas & Parry, LLP

(57) ABSTRACT

The present disclosure provides a method, a device and an apparatus for controlling network slice authentication, and a storage medium. The method includes: obtaining identification information about a third network element from a second network element; and transmitting an authentication and authorization notification to the third network element in accordance with the identification information.

15 Claims, 10 Drawing Sheets

(51) Int. Cl.
*H04W 12/69* (2021.01)
*H04W 48/18* (2009.01)

(56) References Cited

U.S. PATENT DOCUMENTS

| | | | |
|---|---|---|---|
| 2019/0029065 A1 | 1/2019 | Park et al. | |
| 2019/0357129 A1* | 11/2019 | Park | H04W 60/04 |
| 2019/0387401 A1* | 12/2019 | Liao | H04W 4/08 |
| 2020/0053643 A1* | 2/2020 | Lee | H04W 48/10 |
| 2020/0100173 A1 | 3/2020 | Casati | |
| 2020/0163012 A1* | 5/2020 | Zhu | H04W 12/06 |
| 2020/0170066 A1 | 5/2020 | Yang et al. | |
| 2020/0267554 A1* | 8/2020 | Faccin | H04L 63/101 |
| 2020/0344827 A1* | 10/2020 | Zong | H04W 64/00 |
| 2020/0374698 A1 | 11/2020 | Ying et al. | |
| 2020/0404480 A1* | 12/2020 | Zhu | H04W 48/12 |
| 2021/0007027 A1* | 1/2021 | Yang | H04W 36/12 |
| 2021/0084582 A1* | 3/2021 | Li | H04W 16/02 |
| 2021/0136582 A1* | 5/2021 | Liu | H04W 48/16 |
| 2021/0185602 A1 | 6/2021 | Wang | |
| 2022/0132311 A1* | 4/2022 | Zhu | H04W 12/06 |
| 2022/0174488 A1* | 6/2022 | Lei | H04W 12/06 |
| 2022/0248497 A1* | 8/2022 | Tamura | H04W 76/11 |
| 2022/0346051 A1* | 10/2022 | Salkintzis | H04W 12/037 |
| 2022/0408249 A1* | 12/2022 | Zamora | H04W 12/06 |

FOREIGN PATENT DOCUMENTS

| | | |
|---|---|---|
| CN | 110876174 A | 3/2020 |
| IN | 110915264 A | 3/2020 |

OTHER PUBLICATIONS

Written Opinion for PCT/CN2021/079658 issued on Jun. 1, 2021 and its English Translation provided by WIPO.
International Report on Patentibily for PCT/CN2021/079658 issued on Oct. 6, 2022 and its English translation provided by WIPO.
3rd Generation Partnership Project; Technical Specification Group Services and System Aspects; System architecture for the 5G System (5GS); Stage 2 (Release 16), 3GPP TS 23.501 v16.4.0, Mar. 27, 2020, all pages.
"AAA Server triggered Network Slice-Specific Re-authentication and Re-authorization procedure when a UE is served by Different PLMNs for 3GPP Access and Non-3GPP Access," S2-2003066, 3GPP TSG-SA WG2 Meeting #138E , Apr. 20-23, 2020, Elbonia (revision of S2-20xxxxx), Source to WG: CATT, Source to TSG: S2, all pages.
First Chinese Office Action and search report for the corresponding Chinese Patent Application No. 202010264651.7, Issued on Feb. 3, 2022 and its English Translation provided by Global Dossier.
"Update NSSAA for two AMFs serving UE," S2-2002219, 3GPP TSG-WG SA2 Meeting #137E e-meeting, Elbonia, Feb. 24-27, 2020 (revision of S2-200xxxx), Source to WG: Huawei, HiSilicon; Source to Tsg: SA2; all pages.
Second Office Action and search report for the corresponding Chinese Patent Application No. 202010264651.7 issued on Aug. 30, 2022, and its English Translation provided by global dossier.
"Correction on the value of S-NSSAIs for NSSAA," 3GPP TSG-WG SA2 Meeting #137E e-meeting, S2-2002221, Elbonia, Feb. 24-27, 2020, (revision of S2-200xxxx) Source to WG: Huawei, HiSilicon; Source to TSG: SA2; all pages.
3rd Generation Partnership Project; Technical Specification Group Services and System Aspects; Procedures for the 5G System (5GS); Stage 2 (Release 16), 3GPP TS 23.502 V16.4.0 (Mar. 2020), all pages.
Extended European Search Report for European Patent Application No. 21784633.6 issued by the European Patent Office on Aug. 8, 2023.
First Japanese Office Action for Japanese Patent Application No. 2022-560290 issued by the Japanese Patent Office on Aug. 29, 2023 and its English Translation provided by foreign associate.

* cited by examiner

METHOD, DEVICE AND APPARATUS FOR CONTROLLING NETWORK SLICE AUTHENTICATION, AND RELEVANT STORAGE MEDIUM

CROSS-REFERENCE TO RELATED APPLICATIONS

This application is the U.S. national phase of PCT Application No. PCT/CN2021/079658 filed on Mar. 9, 2021, which claims a priority to the Chinese patent application No. 202010264651.7 filed on Apr. 7, 2020, the disclosures of which are incorporated herein by reference in their entireties.

TECHNICAL FIELD

The present disclosure relates to the field of communication technology, in particular to a method, a device and an apparatus for controlling network slice authentication, and relevant storage medium.

BACKGROUND

When authentication and authorization need to be performed by an Authentication, Authorization and Accounting (AAA) server on Single Network Slice Selection Assistance Information (S-NSSAI), an authentication and authorization procedure specific for a network slice is triggered. The AAA server belongs to a Home Public Land Mobile Network (HPLMN) operator or a third party. When the AAA server belongs to the third party, an AAA proxy needs to be deployed in an HPLMN.

During the registration, when an Access and Mobility Management Function (AMF) decides to perform the authentication and authorization on the S-NSSAI in Allowed NSSAI or when re-authentication is triggered by the AAA server, the AMF may trigger the authentication and authorization procedure specific for the network slice. In this procedure, the AMF serves as an Extensible Authentication Protocol (EAP) authenticator, and communicates with the AAA server through an Authentication Server Function (AUSF).

A current authentication and authorization mechanism specific for the network slice does not support such a scenario where a User Equipment (UE) accesses to different Public Land Mobile Networks (PLMNs) through $3^{rd}$-Generation Partnership Project (3GPP) access or non-3GPP access. For example, the UE accesses to an AMF1 and an AMF2 (in different PLMNs) through different access technologies, Allowed NSSAI1 is assigned by the AMF1 for the UE, and Allowed NSSAI2 is assigned by the AMF2 for the UE. The two pieces of Allowed NSSAI include different S-NSSAI. Upon the receipt of a request for authenticating the S-NSSAI1 from the AAA server, based on a conventional scheme, it is impossible for the AUSF to determine the Allowed NSSAI in which the S-NSSAI1 is located, so it is impossible to determine the AMF to which the authentication procedure is initiated.

SUMMARY

An object of the present disclosure is to provide a method, a device and an apparatus for controlling network slice authentication, and relevant storage medium, so as to solve the problem in the related art where the network slice authentication and authorization mechanism does not support a scenario where the UE is provided with a plurality of service management function entities and thereby it is impossible to perform the authentication.

In a first aspect, the present disclosure provides in some embodiments a method for controlling network slice authentication for a first network element, the first network element including an AUSF, the method including: obtaining identification information about a third network element from a second network element; and transmitting an authentication and authorization notification to the third network element in accordance with the identification information.

In some possible embodiments of the present disclosure, the identification information includes Allowed NSSAI and an Identifier (ID) of the third network element, and the authentication and authorization notification carries S-NSSAI to be authorized and authenticated. The transmitting the authentication and authorization notification to the third network element in accordance with the identification information includes: determining a first target third network element, the S-NSSAI to be authorized and authenticated being located in Allowed NSSAI of the first target network element; and transmitting the authentication and authorization notification to the first target third network element.

In some possible embodiments of the present disclosure, the identification information includes an ID of the third network element. Prior to obtaining the identification information about the third network element from the second network element, the method further includes transmitting first target S-NSSAI to the second network element. The obtaining the identification information about the third network element from the second network element includes obtaining IDs of one or more third network elements from the second network element, and the first target S-NSSAI is located in Allowed NSSAI of the one or more third network elements. The transmitting the authentication and authorization notification to the third network element in accordance with the identification information includes transmitting the authentication and authorization notification to at least one third network element in the one or more third network elements in accordance with the ID of the third network element.

In some possible embodiments of the present disclosure, the identification information includes an ID of the third network element. The transmitting the authentication and authorization notification to the third network element in accordance with the identification information includes: requesting Allowed NSSAI assigned by the third network element with the ID for a UE from the third network element with the ID; determining a second target third network element in accordance with the Allowed NSSAI from the third network element with the ID, S-NSSAI to be authorized and authenticated being located in Allowed NSSAI of the second target third network element; and transmitting the authentication and authorization notification to the second target third network element.

In some possible embodiments of the present disclosure, when there are two or more third network elements, subsequent to transmitting the authentication and authorization notification to the third network element, the method further includes obtaining an authentication and authorization result from a third target third network element in the two or more third network elements, and transmitting the authentication and authorization notification result to the other third network elements in the two or more third network elements, and the third target third network element is any third network element in the two or more third network elements.

In some possible embodiments of the present disclosure, when there are two or more third network elements, the transmitting the authentication and authorization notification to the third network element in accordance with the identification information includes: selecting a fourth target third network element from the two or more third network elements in accordance with the identification information; and transmitting the authentication and authorization notification to the fourth target third network element.

In some possible embodiments of the present disclosure, the method further includes: receiving a first message from a fourth network element, the first message carrying EAP success or EAP failure; transmitting a second message to the fourth target third network element, the second message carrying the EAP success or EAP failure; and transmitting a third message to a fifth target third network element, the third message carrying the EAP success or EAP failure, the fifth target third network element being a third network element in the two or more third network elements other than the fourth target third network element.

In some possible embodiments of the present disclosure, when there are two or more third network elements, the authentication and authorization notification carries a first indicator. Subsequent to transmitting the authentication and authorization notification to the third network element, the method further includes: receiving fourth messages from the two or more third network elements, each fourth message carrying the first indicator; and transmitting a fifth message to a fourth network element in accordance with the fourth message from one third network element in the two or more third network elements, and ignoring or discarding the fourth messages from the other third network elements in the two or more third network elements.

In a second aspect, the present disclosure provides in some embodiments a method for controlling network slice authentication for a second network element, the second network element including a Unified Data Management (UDM), the method including: obtaining identification information about at least two third network elements; and transmitting identification information about a target third network element to a first network element, the target third network element being one or more third network elements in the at least two third network elements.

In some possible embodiments of the present disclosure, the identification information includes an ID of the third network element, or includes Allowed NSSAI and the ID of the third network element.

In some possible embodiments of the present disclosure, the method further includes: receiving first target S-NSSAI from the first network element; and selecting the target third network element from the two or more third network elements in accordance with the first target S-NSSAI, and transmitting an ID of the target third network element to the first network element, the first target S-NSSAI being located in Allowed NSSAI of the target third network element.

In a third aspect, the present disclosure provides in some embodiments a method for controlling network slice authentication for a third network element, the third network element including an AMF, the method includes: receiving an authentication and authorization notification from a first network element, the authentication and authorization notification carrying second target S-NSSAI; determining whether the second target S-NSSAI belongs to Allowed NSSAI of a UE to obtain a determination result; and performing processing in accordance with the determination result.

In some possible embodiments of the present disclosure, the performing the processing in accordance with the determination result includes: when the determination result indicates that the second target S-NSSAI does not belong to the Allowed NSSAI of the UE, transmitting a reject message to the first network element; and when the determination result indicates that the second target S-NSSAI belongs to the Allowed NSSAI of the UE, performing any of the followings: executing an authentication and authorization procedure specific for a network slice, transmitting an EAP message to the UE, and transmitting the EAP message to the first network element.

In some possible embodiments of the present disclosure, the method further includes receiving an authentication and authorization result from the first network element.

In some possible embodiments of the present disclosure, the method further includes receiving an authentication and authorization result from a fourth network element.

In some possible embodiments of the present disclosure, the method further includes: receiving a second message from the first network element, the second message carrying EAP success or EAP failure; and transmitting a sixth message to the UE, the sixth message carrying the EAP success or the EAP failure.

In some possible embodiments of the present disclosure, the method further includes: receiving a third message from the first network element, the third message carrying EAP success or EAP failure; and transmitting a configuration update procedure to the UE in accordance with the third message.

In some possible embodiments of the present disclosure, the authentication and authorization notification carries a first indicator. The method further includes: transmitting a seventh message to the UE, the seventh message carrying the first indicator; receiving an eighth message from the UE, the eighth message carrying the first indicator; and transmitting a fourth message to the first network element in accordance with the eighth message, the fourth message carrying the first indicator.

In some possible embodiments of the present disclosure, the method further includes: receiving a request from the first network element; and transmitting Allowed NSSAI to the first network element in accordance with the request.

In a fourth aspect, the present disclosure provides in some embodiments a method for controlling network slice authentication for a fourth network element, the fourth network element including an AAA server, the method including, when an authentication and authorization procedure specific for a network slice is triggered by a third network element and an authentication and authorization result for S-NSSAI requested by the third network element has been stored, directly returning the authentication and authorization result.

In some possible embodiments of the present disclosure, the method further includes: transmitting a first message to a first network element, the first message carrying EAP success or EAP failure; or receiving a fifth message from the first network element, the fifth message being transmitted by the first network element in accordance with a fourth message from one third network element in two or more third network elements when the first messages have been received from the two or more third network elements and each first message carries a first indicator, the fourth message from the other third network element in the two or more third network elements being ignored or discarded by the first network element.

In a fifth aspect, the present disclosure provides in some embodiments a device for controlling network slice authentication for a first network element, the first network element including an AUSF, the device including: a first obtaining module configured to obtain identification information about a third network element from a second network element; and a first transmission module configured to transmit an authentication and authorization result to the third network element in accordance with the identification information.

In a sixth aspect, the present disclosure provides in some embodiments a device for controlling network slice authentication for a second network element, the second network element including a UDM, the device including: a first obtaining module configured to obtain identification information about at least two third network elements; and a first transmission module configured to transmit the identification information about a target third network element to a first network element, the target third network element being one or more third network element in the at least two third network elements.

In a seventh aspect, the present disclosure provides in some embodiments a device for controlling network slice authentication for a third network element, the third network element including an AMF, the device including: a first reception module configured to receive an authentication and authorization notification from a first network element, the authentication and authorization notification carrying second target S-NSSAI; a first determination module configured to determine whether the second target S-NSSAI belongs to Allowed NSSAI of a UE to obtain a determination result; and a first processing module configured to perform processing in accordance with the determination result.

In an eighth aspect, the present disclosure provides in some embodiments an apparatus for controlling network slice authentication for a first network element, the first network element including an AUSF, the apparatus including a transceiver, a memory, a processor, and a program stored in the memory and executed by the processor. The processor is configured to read the program in the memory, so as to: obtain identification information about a third network element from a second network element; and transmit an authentication and authorization notification to the third network element in accordance with the identification information.

In some possible embodiments of the present disclosure, the identification information includes Allowed NSSAI and an ID of the third network element, and the authentication and authorization notification carries S-NSSAI to be authorized and authenticated. The processor is further configured to read the program in the memory, so as to: determine a first target third network element, the S-NSSAI to be authorized and authenticated being located in Allowed NSSAI of the first target network element; and transmit the authentication and authorization notification to the first target third network element.

In some possible embodiments of the present disclosure, the identification information includes an ID of the third network element. The processor is further configured to read the program in the memory, so as to: transmit first target S-NSSAI to the second network element; obtain IDs of one or more third network elements from the second network element, the first target S-NSSAI being located in Allowed NSSAI of the one or more third network elements; and transmit the authentication and authorization notification to at least one third network element in the one or more third network elements in accordance with the ID of the third network element.

In some possible embodiments of the present disclosure, the identification information includes an ID of the third network element. The processor is further configured to read the program in the memory, so as to: request Allowed NSSAI assigned by the third network element with the ID for a UE from the third network element with the ID; determine a second target third network element in accordance with the Allowed NSSAI from the third network element with the ID, S-NSSAI to be authorized and authenticated being located in Allowed NSSAI of the second target third network element; and transmit the authentication and authorization notification to the second target third network element.

In some possible embodiments of the present disclosure, the processor is further configured to read the program in the memory, so as to, when there are two or more third network elements, obtain an authentication and authorization result from a third target third network element in the two or more third network elements, and transmit the authentication and authorization notification result to the other third network elements in the two or more third network elements, and the third target third network element is any third network element in the two or more third network elements.

In some possible embodiments of the present disclosure, when there are two or more third network elements, the processor is further configured to read the program in the memory, so as to: select a fourth target third network element from the two or more third network elements in accordance with the identification information; and transmit the authentication and authorization notification to the fourth target third network element.

In some possible embodiments of the present disclosure, the processor is further configured to read the program in the memory, so as to: receive a first message from a fourth network element, the first message carrying EAP success or EAP failure; transmit a second message to the fourth target third network element, the second message carrying the EAP success or EAP failure; and transmit a third message to a fifth target third network element, the third message carrying the EAP success or EAP failure, the fifth target third network element being a third network element in the two or more third network elements other than the fourth target third network element.

In some possible embodiments of the present disclosure, when there are two or more third network elements, the authentication and authorization notification carries a first indicator. The processor is further configured to read the program in the memory, so as to: receive fourth messages from the two or more third network elements, each fourth message carrying the first indicator; and transmit a fifth message to a fourth network element in accordance with the fourth message from one third network element in the two or more third network elements, and ignore or discard the fourth messages from the other third network elements in the two or more third network elements.

In a ninth aspect, the present disclosure provides in some embodiments an apparatus for controlling network slice authentication for a second network element, the second network element including a UDM, the apparatus including a transceiver, a memory, a processor, and a program stored in the memory and executed by the processor. The processor is configured to read the program in the memory, so as to: obtain identification information about at least two third network elements; and transmit identification about a target third network element to a first network element, the target third network element being one or more third network elements in the at least two third network elements.

In some possible embodiments of the present disclosure, the identification information includes an ID of the third network element, or includes Allowed NSSAI and the ID of the third network element.

In some possible embodiments of the present disclosure, the processor is further configured to read the program in the memory, so as to: receive first target S-NSSAI from the first network element; and select the target third network element from the two or more third network elements in accordance with the first target S-NSSAI, and transmit an ID of the target third network element to the first network element, the first target S-NSSAI being located in Allowed NSSAI of the target third network element.

In a tenth aspect, the present disclosure provides in some embodiments an apparatus for controlling network slice authentication for a third network element, the third network element including an AMF, the apparatus including a transceiver, a memory, a processor, and a program stored in the memory and executed by the processor. The processor is configured to read the program in the memory, so as to: receive an authentication and authorization notification from a first network element, the authentication and authorization notification carrying second target S-NSSAI; determine whether the second target S-NSSAI belongs to Allowed NSSAI of a UE to obtain a determination result; and perform processing in accordance with the determination result.

In some possible embodiments of the present disclosure, the processor is further configured to read the program in the memory, so as to: when the determination result indicates that the second target S-NSSAI does not belong to the Allowed NSSAI of the UE, transmit a reject message to the first network element; and when the determination result indicates that the second target S-NSSAI belongs to the Allowed NSSAI of the UE, perform any of the followings: executing an authentication and authorization procedure specific for a network slice, transmitting an EAP message to the UE, and transmitting the EAP message to the first network element.

In some possible embodiments of the present disclosure, the processor is further configured to read the program in the memory, so as to receive an authentication and authorization result from the first network element.

In some possible embodiments of the present disclosure, the processor is further configured to read the program in the memory, so as to: receive a second message from the first network element, the second message carrying EAP success or EAP failure; and transmit a sixth message to the UE, the sixth message carrying the EAP success or the EAP failure.

In some possible embodiments of the present disclosure, the processor is further configured to read the program in the memory, so as to: receive a third message from the first network element, the third message carrying EAP success or EAP failure; and transmit a configuration update procedure to the UE in accordance with the third message.

In some possible embodiments of the present disclosure, the processor is further configured to read the program in the memory, so as to: transmit a seventh message to the UE, the seventh message carrying a first indicator; receive an eighth message from the UE, the eighth message carrying the first indicator; and transmit a fourth message to the first network element in accordance with the eighth message, the fourth message carrying the first indicator.

In some possible embodiments of the present disclosure, the processor is further configured to read the program in the memory, so as to: receive a request from the first network element; and transmit Allowed NSSAI to the first network element in accordance with the request.

In an eleventh aspect, the present disclosure provides in some embodiments a computer-readable storage medium storing therein a computer program. The computer program is executed by a processor, so as to implement the steps in the method for controlling network slice authentication in the first aspect, or the steps in the method for controlling network slice authentication in the second aspect, or the steps in the method for controlling network slice authentication in the third aspect, or the steps in the method for controlling network slice authentication in the fourth aspect.

According to the embodiments of the present disclosure, the first network element transmits the authentication and authorization notification to one or more third network elements. As a result, in a scenario where the UE is provided with a plurality of service management function entities, it is able to perform the authentication and authorization specific for the network slice, thereby to ensure the successful execution of the authentication.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
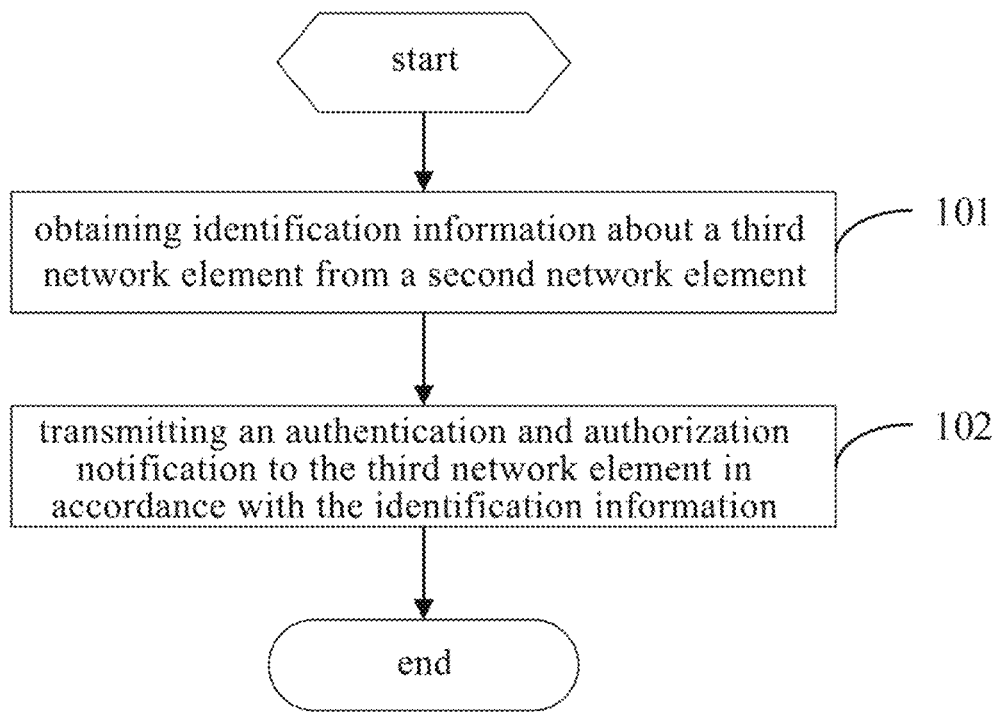
FIG. 1 is a flow chart of a method for controlling network slice authentication according to one embodiment of the present disclosure.

Referring to FIG. 1, the present disclosure provides a method for controlling network slice authentication for a first network element. The first network element is an AUSF. As shown in FIG. 1, the method includes the following steps.

Step 101: obtaining identification information about a third network element from a second network element.

The second network element is a UDM, and the third network element is an AMF. The identification information includes an ID of the third network element, or Allowed NDSSAI and the ID of the third network element.

Step 102: transmitting an authentication and authorization notification to the third network element in accordance with the identification information.

In this step, the first network element transmits the authentication and authorization notification to one or more third network elements.

In the embodiments of the present disclosure, the first network element transmits, or does not transmit, S-NSSAI to the second network element.

When the first network element does not transmit the S-NSSAI to the second network element, the second network element returns the Allowed NSSAI of the one or more third network elements and the IDs of the one or more third network elements to the first network element. The Allowed NSSAI is a set of S-NSSAI, and it includes S-NSSAI1, S-NSSAI2, S-NSSAI3, etc. The authentication and authorization notification transmitted to the third network element carries S-NSSAI to be authorized and authenticated. At this time, in Step 102, the first network element determines a first target third network element, and the S-NSSAI to be authorized and authenticated is located in Allowed NSSAI of the first target third network element. Next, the first network element transmits the authentication and authorization notification to the first target third network element. In other words, the first network element determines the Allowed NSSAI of the third network element in which the Allowed NSSAI returned by the second network element is located, and then transmits the authentication and authorization notification to the determined third network element.

When the first network element does not transmit the S-NSSAI to the second network element, the second network element returns the IDs of the one or more third network elements to the first network element. At this time, the AUSF requests Allowed NSSAI assigned by the third network element with the ID for a UE from the third network element with the ID. Next, the AUSF determines a second target third network element in accordance with the Allowed NSSAI from the third network element with the ID. The S-NSSAI to be authorized and authenticated is located in Allowed NSSAI of the second target third network element. Then, the AUSF transmits the authentication and authorization notification to the second target third network element.

For example, the IDs returned by the second network element include IDs of two third network elements. The AUSF transmits requests to the two third network elements so as to request for Allowed NSSAI of the two third network elements. Next, the AUSF determines the third network element in which the S-NSSAI to be authorized and authenticated is located. Presumed that the AUSF determines that the S-NSSAI to be authorized and authenticated is located in one of the third network elements, it transmits the authentication and authorization notification to the determined third network element.

When the first network element transmits to the S-NSSAI to the second network element, the second network element returns the IDs of the one or more third network elements to the first network element. To be specific, based on the above, the first network further transmits first target S-NSSAI to the second network element, and the first target S-NSSAI is just the S-NSSAI to be authenticated and authorized. In this case, the first network element obtains the IDs of the one or more third network elements from the second network element, and the first target S-NSSAI is located in the Allowed NSSAI of the one or more third network elements. At this time, in Step 102, the first network element transmits the authentication and authorization notification to at least one third network elements in the one or more third network elements in accordance with the ID. In other words, the first network elements transmit the authentication and authorization notification to one third network element or a plurality of third network elements.

For example, the second network element returns the IDs of two third network elements to the first network element, and the first network element transmits the authentication and authorization notification either to both the two third network elements or to one of the two third network elements.

In the embodiments of the present disclosure, when the ID of one third network element is obtained by the first network element, the first network element directly transmits the authentication and authorization notification to the third network element.

When the IDs of two or more third network elements are obtained by the first network element, the first network element transmits the authentication and authorization notification to one third network element or the two or more third network elements. In this case, the following different processings are performed by the first network element.

(1) In order to ensure an authentication success rate, when the first network element has received a reject message from a second target third network element, the first network element transmits the authentication and authorization notification to the other third network element(s) in the third network elements, and the second target third network element is any third network element in the third network elements.

For example, the first network element transmits the authentication and authorization notification to two third network elements. And upon the receipt of the reject message from one third network element, the first network element transmits the authentication and authorization notification to the other third network element.

(2) In order to ensure the authentication success rate, when the first network element has received EAP messages and S-NSSAI from two or more third network elements and the two or more third network elements provide the same S-NSSAI, the first network element selects one third network element from the two or more third network elements to initiate an authentication procedure, and transmits a reject message to the other third network element(s) in the two or more third network elements.

For example, the first network element has transmitted the authentication and authorization notification related to the same S-NSSAI to two third network elements and has received EAP messages and the S-NSSAI from the two third network elements, and the two third network elements have the same S-NSSAI, the first network element selects one third network element in the two third network elements as a network element for which the authentication procedure is to be initiated, and transmits the reject message to the other third network element.

(3) The first network element receives a reject message from a second target third network element, the reject message is used to indicate that the authentication and authorization procedure is currently being performed by the UE and the other third network element in the two or more third network elements, and the second target third network element is any third network element in the third network elements.

(4) The first network element obtains an authentication and authorization result from a third target third network element in the two or more third network elements, and transmits the authentication and authorization result to the other third network element(s) in the two or more third network elements. The third target third network element is any third network element in the third network elements.

In other words, in this case, the first network element transmits the authentication and authorization result of any third network element to the other third network element(s).

Based on the above, the first network element selects a fourth target third network element from the two or more third network elements in accordance with the obtained identification information, and transmits the authentication and authorization notification to the fourth target third network element. To be specific, the first network element randomly selects a network element as the fourth target third network element. Alternatively, the first network element obtains information about the UE from the second network element, and selects a third network element from two or more third network elements as the fourth target third network element in accordance with the information about the UE. For example, the information about the UE includes an access network to which the UE accesses, and a connection status of the UE in different access networks.

In some possible embodiments of the present disclosure, the first network element forwards a message between the fourth network element and the third network element. For example, the first network element receives a first message from the fourth network element, and the first message carries EAP success or EAP failure. Next, the first network element transmits a second message to the fourth target third network element, and the second message carries the EAP success or the EAP failure. Then, the first network element transmits a third message to a fifth target third network element, the third message carries the EAP success or EAP failure, and the fifth target third network element is a third network element in the two or more third network elements other than the fourth target third network element. The fifth target third network element determines whether an authentication result is the same as a currently-stored authentication result of the S-NSSAI in accordance with the received third message. If yes, the fifth target third network element does not perform any operation, and if not, the fifth target third network element transmits a UE configuration update procedure to the UE so as to update the Allowed NSSAI of the UE.

In some possible embodiments of the present disclosure, when the first network element transmits the authentication and authorization notification to two or more third network elements, a first indicator is carried in the authentication and authorization notification, and the first indicator is used to indicate that the authentication and authorization notifications transmitted to different third network elements are related to each other. In this case, subsequent to transmitting the authentication and authorization notification to the third network element, the method further includes: receiving fourth messages from the two or more third network elements, each fourth message carrying the first indicator; and transmitting a fifth message to a fourth network element in accordance with the fourth message from one third network element in the two or more third network elements, and ignoring or discarding the fourth messages from the other third network element(s) in the two or more third network elements.

For example, the first network element transmits the authentication and authorization notification to two third network elements and the authentication and authorization notification carries the first indicator. When the first network element has received the fourth messages from the two third network elements and the first indicator is carried in the fourth messages, the first network element ignores or discards the fourth message from one third network element, and transmits a fifth message to the fourth network element merely in accordance with the fourth message from one of the third network elements.

According to the embodiments of the present disclosure, the first network element transmits the authentication and authorization notification to one or more third network elements. As a result, in a scenario where the UE is provided with a plurality of service management function entities, it is able to perform the authentication and authorization specific for the network slice, thereby to ensure the successful execution of the authentication.

Figure 2:
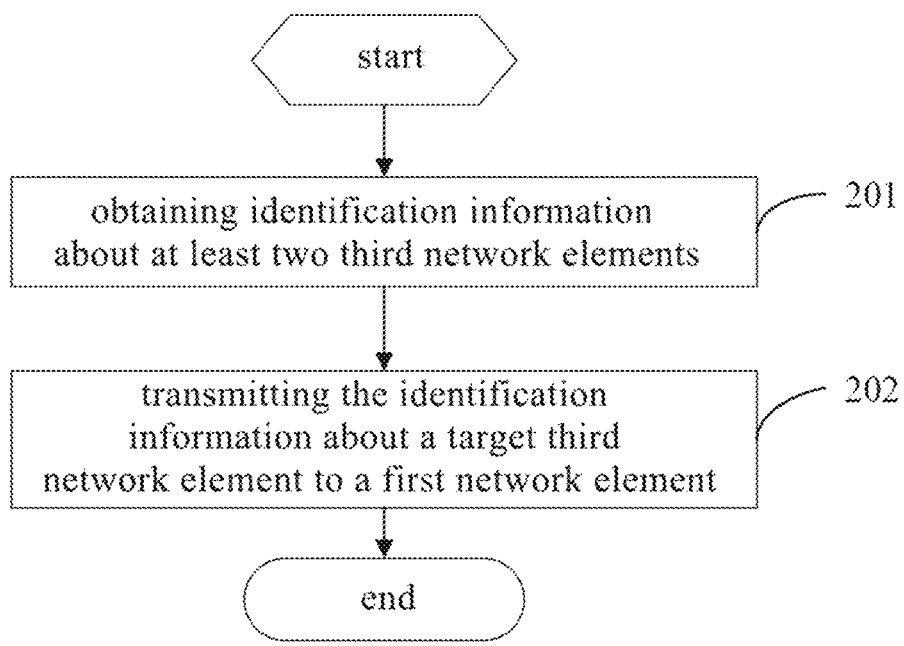
FIG. 2 is another flow chart of the method for controlling network slice authentication according to one embodiment of the present disclosure.

Referring to FIG. 2, the present disclosure further provides in some embodiments a method for controlling network slice authentication for a second network element, and the second network element is a UDM. As shown in FIG. 2, the method includes the following steps.

Step 201: obtaining identification information about at least two third network elements.

The second network element obtains the identification information about the third network element from the third network element. The identification information includes an ID of the third network element, or Allowed NSSAI and the ID of the third network element.

Step 202: transmitting identification information about a target third network element to a first network element, the target third network element being one or more third network elements in the at least two third network elements.

In the embodiments of the present disclosure, the first network element transmits, or does not transmit, S-NSSAI to the second network element.

When the first network element does not transmit the S-NSSAI to the second network element, the second network element returns the Allowed NSSAI of the one or more third network elements and the IDs of the one or more third network elements to the first network element. The Allowed NSSAI is a set of S-NSSAI, and it includes S-NSSAI1, S-NSSAI2, S-NSSAI3, etc.

When the first network element transmits to the S-NSSAI to the second network element, the second network element receives first target S-NSSAI from the first network element, selects the target third network element from the two or more third network elements in accordance with the first target S-NSSAI, and transmits the ID of the target third network element to the first network element. The first target S-NSSAI is located in the Allowed NSSAI of the target third network element.

Based on the above, the second network element furthers transmits information about a UE to the first network element, so that the first network element selects the third network element to which the authentication and authorization notification is to be transmitted in accordance with the information about the UE. For example, the information about the UE includes an access network to which the UE accesses and connection statuses of the UE in different access networks.

According to the embodiments of the present disclosure, the first network element transmits the authentication and authorization notification to one or more third network elements. As a result, in a scenario where the UE is provided with a plurality of service management function entities, it is able to perform the authentication and authorization specific for the network slice, thereby to ensure the successful execution of the authentication.

Figure 3:
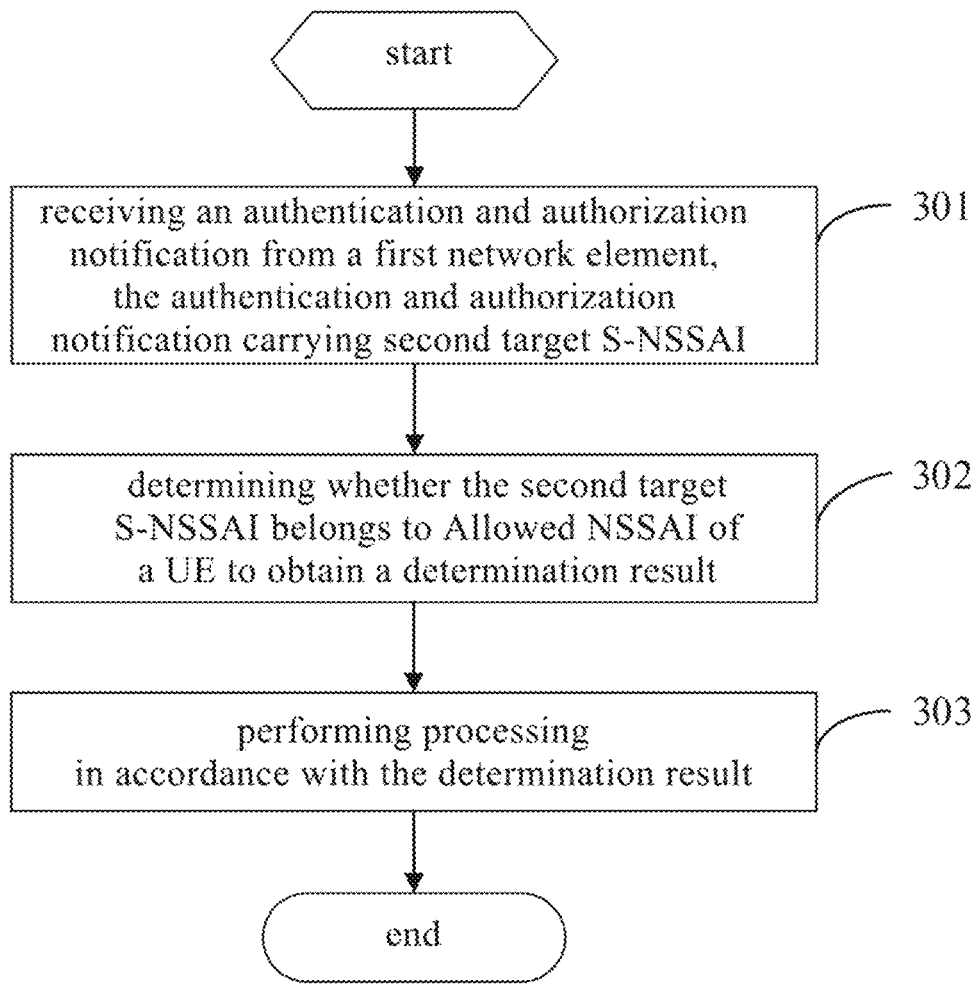
FIG. 3 is yet another flow chart of the method for controlling network slice authentication according to one embodiment of the present disclosure.

Referring to FIG. 3, the present disclosure further provides in some embodiments a method for controlling network slice authentication for a third network element. The third network element is an AMF. As shown in FIG. 3, the method includes: Step 301 of receiving an authentication and authorization notification from a first network element, the authentication and authorization notification carrying second target S-NSSAI; Step 302 of determining whether the second target S-NSSAI belongs to Allowed NSSAI of a UE to obtain a determination result; and Step 303 of performing processing in accordance with the determination result.

To be specific, in Step 303, when the determination result indicates that the second target S-NSSAI does not belong to the Allowed NSSAI of the UE, a reject message is transmitted to the first network element, and when the determination result indicates that the second target S-NSSAI belongs to the Allowed NSSAI of the UE, any of the followings is performed: (1) executing an authentication and authorization procedure specific for a network slice, (2) transmitting an EAP message to the UE, and (3) transmitting the EAP message to the first network element.

In some possible embodiments of the present disclosure, when the third network element transmits the EAP message to the UE, subsequent to transmitting the EAP message to the UE, the method further includes receiving a reject message from the UE, and transmitting the reject message to the first network element.

In some possible embodiments of the present disclosure, in order to save resources, the second network element further receives an authentication and authorization result from the first network element.

In some possible embodiments of the present disclosure, the second network element further receives an authentication and authorization result from a fourth network element, and the fourth network element is an AAA server.

In some possible embodiments of the present disclosure, the third network element further receives a second message from the first network element, and the second message carries EAP success or EAP failure. In addition, the third network element transmits a sixth message to the UE, and the sixth message carries the EAP success or EAP failure.

In some possible embodiments of the present disclosure, the third network element further receives a third message from the first network element, and the third message carries the EAP success or EAP failure. Then, the third network element transmits a configuration update procedure to the UE in accordance with the third message. To be specific, when an authentication and authorization result determined in accordance with the third message is different from a stored authentication and authorization result, the third network element transmits the configuration update procedure to the UE, and when the authentication and authorization result is the same as the stored authentication and authorization result, the third network element does not perform any processing.

In some possible embodiments of the present disclosure, a first indicator is carried in the authentication and authorization notification. In this case, the third network element further transmits a seventh message to the UE, and the seventh message carries a first indicator. The third network element receives an eighth message from the UE, and the eighth message carries the first indicator. Then, the third network element transmits a fourth message to the first network element in accordance with the eighth message, and the fourth message carries the first indicator.

In actual use, when the UE has received two or more seventh messages carrying the first indicator, the UE merely processes the seventh message from one third network element, and ignores or discards the other seventh message (s). In addition, the UE returns an eighth message to the third network element.

In some possible embodiments of the present disclosure, the second network element further receives a request from the first network element, and transmits Allowed NSSAI to the first network element in accordance with the request. In other words, the second network element transmits the information about the UE to the first network element in accordance with the request.

According to the embodiments of the present disclosure, the first network element transmits the authentication and authorization notification to one or more third network elements. As a result, in a scenario where the UE is provided with a plurality of service management function entities, it is able to perform the authentication and authorization specific for the network slice, thereby to ensure the successful execution of the authentication.

Figure 4:
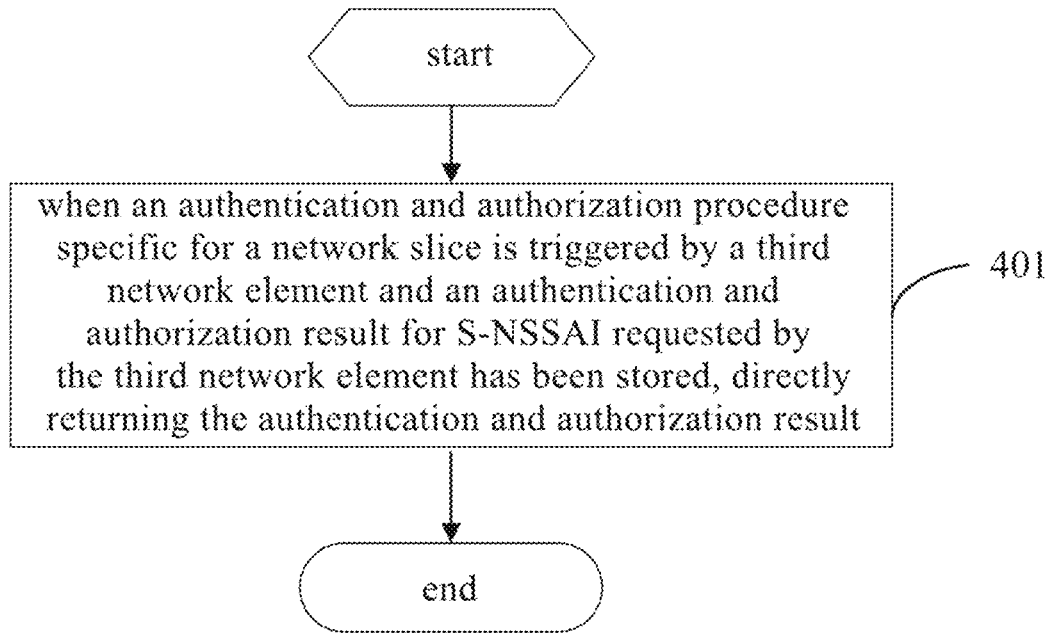
FIG. 4 is still yet another flow chart of the method for controlling network slice authentication according to one embodiment of the present disclosure.

Referring to FIG. 4, the present disclosure further provides in some embodiments a method for controlling network slice authentication for a fourth network element. The fourth network element is an AAA server. As shown in FIG. 4, the method includes Step 401 of, when an authentication and authorization procedure specific for a network slice is triggered by a third network element and an authentication and authorization result for S-NSSAI requested by the third network element has been stored, directly returning the authentication and authorization result.

In the embodiments of the present disclosure, when the authentication and authorization procedure specific for the network slice is triggered by the fourth network element, the fourth network element further transmits a first message to a first network element, and the first message carries EAP success or EAP failure information. Alternatively, the fourth network element receives a fifth message from the first network element, the fifth message is transmitted by the first network element in accordance with a fourth message from one third network element in two or more third network elements when the first messages have been received from the two or more third network elements and each first message carries a first indicator, and the fourth message from the other third network element in the two or more third network elements is ignored or discarded by the first network element.

According to the embodiments of the present disclosure, the first network element transmits the authentication and authorization notification to one or more third network elements. As a result, in a scenario where the UE is provided with a plurality of service management function entities, it is able to perform the authentication and authorization specific for the network slice, thereby to ensure the successful execution of the authentication.

Figure 5:
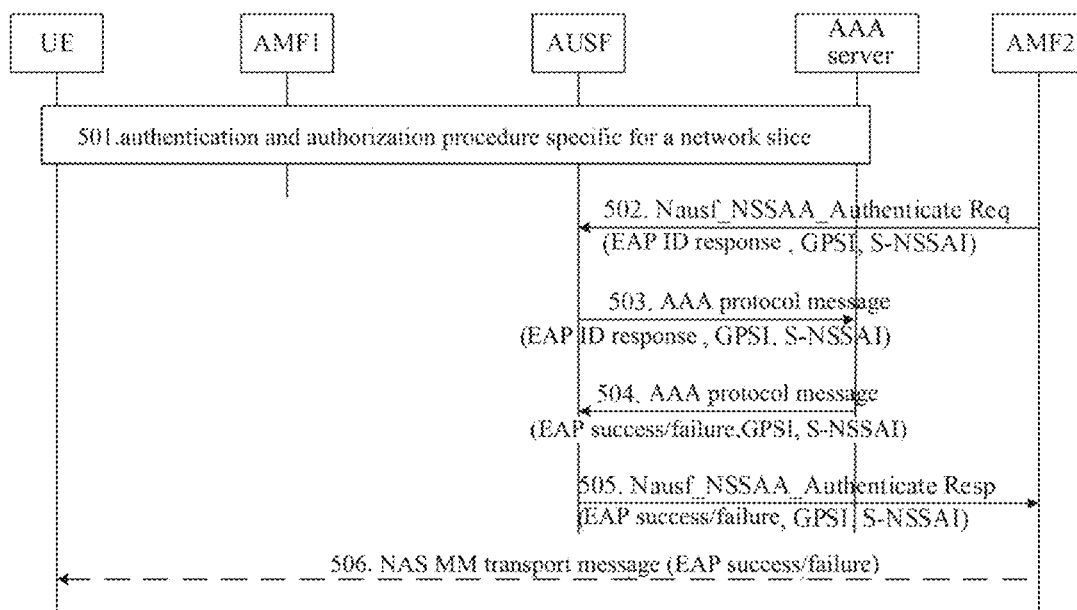
FIG. 5 is a schematic view showing an authentication and authorization procedure triggered by an AMF according to one embodiment of the present disclosure.

FIG. 5 shows an authentication and authorization procedure triggered by the AMF according to one embodiment of the present disclosure. When the authentication and authorization procedure specific for a network slice is triggered by the AMF and an authentication and authorization result of S-NSSAI has been stored in the AAA server, the AAA server directly returns an authentication and authorization result. As shown in FIG. 5, the authentication and authorization procedure includes the following steps.

Step 501: an AMF1 initiates the authentication and authorization procedure specific for the network slice with respect to S-NSSAI, and after the procedure has ended, the authorization of storing the S-NSSAI in the AAA service has been allowed.

Steps 502 and 503: an AMF2 initiates the authentication and authorization procedure specific for the network slice with respect to the S-NSSAI.

To be specific, the AMF2 transmits Nausf_NSSAA_Authenticate (Nausf_NSSAA_Authenticate Req) to the AUSF, and the request carries an EAP ID response message, an AAA server address, a Generic Public Subscription Identifier (GPSI), and the S-NSSAI.

When an AAA proxy (AAA-P) has been deployed, the AUSF transmits the EAP ID response message, the GPSI and the S-NSSAI to the AAA server, otherwise, the message is directly transmitted to the AUSF. The AUSF uses an AAA protocol message supported by the AAA proxy or the AAA server to encapsulate the EAP ID response message, the GPSI and the S-NSSAI, and transmits the AAA protocol message to the AAA proxy or AAA server.

Step 504: upon the receipt of the authentication and authorization request, the AAA server looks up information stored locally, and when the authorization of the S-NSSAI has been allowed, transmits the AAA protocol message to the AUSF. The AAA protocol message includes EAP success, the GPSI and the S-NSSAI.

Step 505: the AUSF transmits an Nausf_NSSAA_Authenticate response message (Nausf_NSSAA_Authenticate Resp) to the AMF2. The message includes the EAP success, the GPSI and the S-NSSAI. An authentication and authorization status/result of the S-NSSAI is stored in the AMF2.

Step 506: the AMF2 returns the EAP success to the UE through a Non-Access Stratum (NAS) message (NAS MM Transport).

Figure 6:
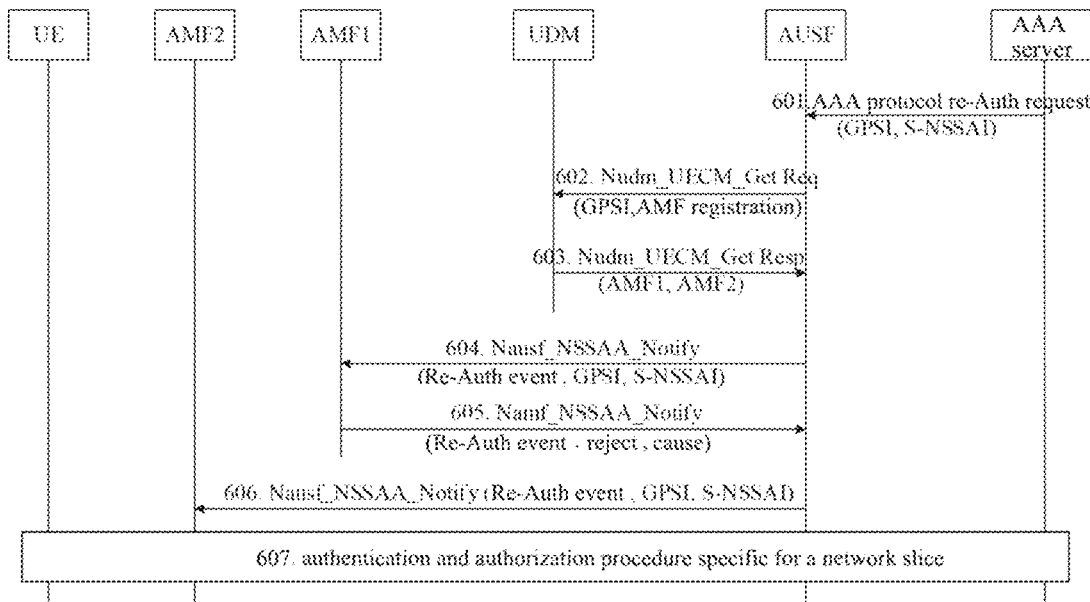
FIG. 6 is a schematic view showing an authentication and authorization procedure specific for a network slice initiated by an AAA server according to one embodiment of the present disclosure.

FIG. 6 shows an authentication and authorization procedure specific for a network slice initiated by the AAA server according to one embodiment of the present disclosure. In this procedure, the UDM returns two AMF IDs to the AUSF, and the AUSF merely transmits an authentication and authorization notification to one AMF. As shown in FIG. 6, the procedure includes the following steps.

Step 601: the AAA server (AAA-S) transmits an AAA protocol re-authentication request (AAA Protocol Re-Auth Request) carrying the GPSI and the S-NSSAI, so as to request a UE identified by the GPSI to perform the re-authentication and re-authorization on the network slice identified by the S-NSSAI. When an AAA proxy (AAA-P) has been deployed, the request is transmitted to the AAA proxy, otherwise, it is directly transmitted to the AUSF. When the AAA proxy has been deployed, the AAA proxy forwards the message to the AUSF.

Steps 602 and 603: the AUSF obtains the AMF ID from the UDM through Nudm_UECM_Get. Information about two AMFs has been stored in the UDM, so the UDM returns the identification information about the two AMFs, i.e., AMF1 and AMF2, to the AUSF through Nudm_UECM_Get Resp.

In FIG. 6, when the AUSF fails to provide the S-NSSAI to be authenticated and authorized to the UDM, the UDM returns the identification information about the two AMFs, i.e., an AMF1 ID and Allowed NSSAI, and an AMF2 ID and Allowed NSSAI.

Step 604: the AUSF transmits a re-authentication event to the AMF1.

To be specific, the AUSF transmits Nausf_NSSAA_Notify to the AMF1, and the message carries the Re-Auth event, the GPSI and the S-NSSAI.

Step 605: the AMF1 determines that the S-NSSAI does not belong to the Allowed NSSAI of the AMF1, and returns a re-authentication reject notification to the AUSF. The notification carries a reject cause, so as to indicate that the S-NSSAI does not belong to the Allowed NSSAI.

To be specific, the AMF1 transmits Namf_NSSAA_Notify to the AUSF, and the message carries Re-Auth event reject and cause.

Step 606: the AUSF transmits the re-authentication event to the AMF2.

To be specific, the AUSF transmits Nausf_NSSAA_Notify to the AMF2, and the message carries the Re-Auth event, the GPSI and the S-NSSAI.

Step 607: the AMF2 initiates the authentication and authorization procedure specific for the network slice.

In the embodiments of the present disclosure, when the AUSF provides the S-NSSAI in Step 602, the UDM returns in Step 603 the AMF whose Allowed NSSAI includes the S-NSSAI. The UDM obtains the Allowed NSSAI from the AMF. In other words, when the AUSF provides the S-NSSAI to be authenticated and authorization to the UDM, the UDM may determine the Allowed NSSAI of the AMF in which the S-NSSAI to be authenticated and authorized is located, and then returns an ID of the corresponding AMF to the AUSF. In addition, in this case, in Step 604, the AUSF directly transmits the re-authentication event to the AMF (the ID of the AMF1 returned by the UDM is taken as an example in FIG. 6). Steps 605 and 606 are not performed subsequently, and instead, the AMF1 initiates the authentication and authorization procedure specific for the network slice.

In the embodiments of the present disclosure, when the identification information about two AMFs is returned by the UDM, i.e., AMF1 ID and Allowed NSSAI, and AMF2 ID and Allowed NSSAI, the AUSF may transmit the authentication and authorization notification to any AMF, and then transmits the authentication and authorization result to the other AMF.

For example, upon the receipt of the information returned by the UDM, the AUSF determines the Allowed NSSAI of the AMF in which the S-NSSAI to be authorized and authenticated is located, and then transmits the re-authentication event to the AMF. Here, the determination result indicates that the S-NSSAI is located in the Allowed NSSAI of the AMF1. The AUSF transmits the authentication and authorization notification to the AMF1, and obtains the authentication and authorization result of the AMF1. Then, the AUSF further transmits the authentication and authorization result to the AMF2.

Figure 7:
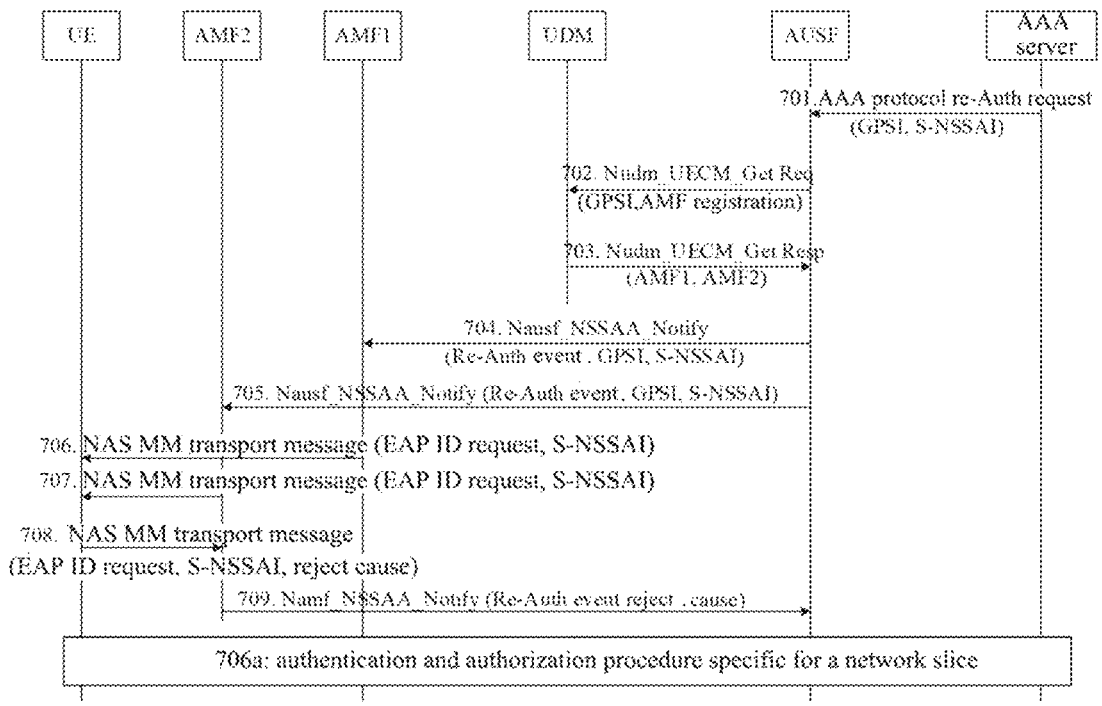
FIG. 7 is a schematic view showing the authentication and authorization procedure specific for the network slice initiated by the AAA server according to one embodiment of the present disclosure.

FIG. 7 shows an authentication and authorization procedure specific for a network slice initiated by the AAA server according to one embodiment of the present disclosure. In this procedure, the UDM returns two AMF IDs to the AUSF, and the AUSF transmits the authentication and authorization notification to the AMFs simultaneously. When the AMF has received the authentication and authorization notification and the AMF needs to request for an ID of the UE, as shown in FIG. 7, the procedure includes the following steps.

Step 701: the AAA server (AAA-S) transmits an AAA protocol re-authentication request (AAA Protocol Re-Auth Request) carrying the GPSI and the S-NSSAI to request the UE identified by the GPSI to perform the re-authentication and re-authorization on the network slice identified by the S-NSSAI. When an AAA proxy (AAA-P) has been deployed, the request is transmitted to the AAA proxy, otherwise it is directly transmitted to the AUSF. When the AAA proxy has been deployed, the AAA proxy forwards the message to the AUSF.

Steps 702 and 703: the AUSF obtains the AMF ID from the UDM through Nudm_UECM_Get. Information about two AMFs has been stored in the UDM, so the UDM returns two AMF IDs, i.e., AMF1 and AMF2, to the AUSF through Nudm_UECM_Get Resp.

In the above embodiments of the present disclosure, when the AUSF provides the S-NSSAI in Step 702, the UDM returns in Step 703 the AMF whose Allowed NSSAI includes the S-NSSAI. UDM may obtain Allowed NSSAI from the AMF.

Step 704: the AUSF transmits a re-authentication event to the AMF1.

To be specific, the AUSF transmits Nausf_NSSAA_Notify to the AMF1, and the message carries the Re-Auth event, the GPSI and the S-NSSAI.

Step 705: the AUSF transmits the re-authentication event to the AMF2.

To be specific, the AUSF transmits Nausf_NSSAA_Notify to the AMF2, and the message carries the Re-Auth event, the GPSI and the S-NSSAI.

Step 706: the AMF1 transmits an EAP message to the UE.

To be specific, the AMF1 transmits NAS MM Transport to the UE, and the message carries an EAP ID request and the S-NSSAI.

Step 707: the AMF2 transmits an EAP message to the UE.

To be specific, the AMF2 transmits NAS MM Transport to the UE, and the message carries an EAP ID request and the S-NSSAI.

As shown by Step 706a, the UE selects to perform the authentication and authorization procedure specific for the network slice on the S-NSSAI through the AMF1, and a specific selection mode depends on the implementation. For example, when the UE first receives the EAP message from an AMF, it may select the AMF to perform the authentication and authorization procedure. Here, it is presumed that the UE selects the AMF1.

Step 708: the UE returns a reject EAP message and a reject cause to the AMF2. The reject cause indicates that the authentication and authorization procedure is currently being performed through the other AMF(s).

To be specific, the UE transmits NAS MM Transport to the AMF2, and the message carries the EAP ID request, the S-NSSAI, and the reject cause.

Step 709: the AMF2 notifies the AUSF that the re-authentication is rejected, and transmits the reject cause to the AUSF, so as to indicate that the authentication and authorization procedure is currently being performed through the other AMF(s).

To be specific, the AMF2 transmits Namf_NSSAA_Notify to the AUSF, and the message carries Re-Auth event reject and its cause.

Figure 8:
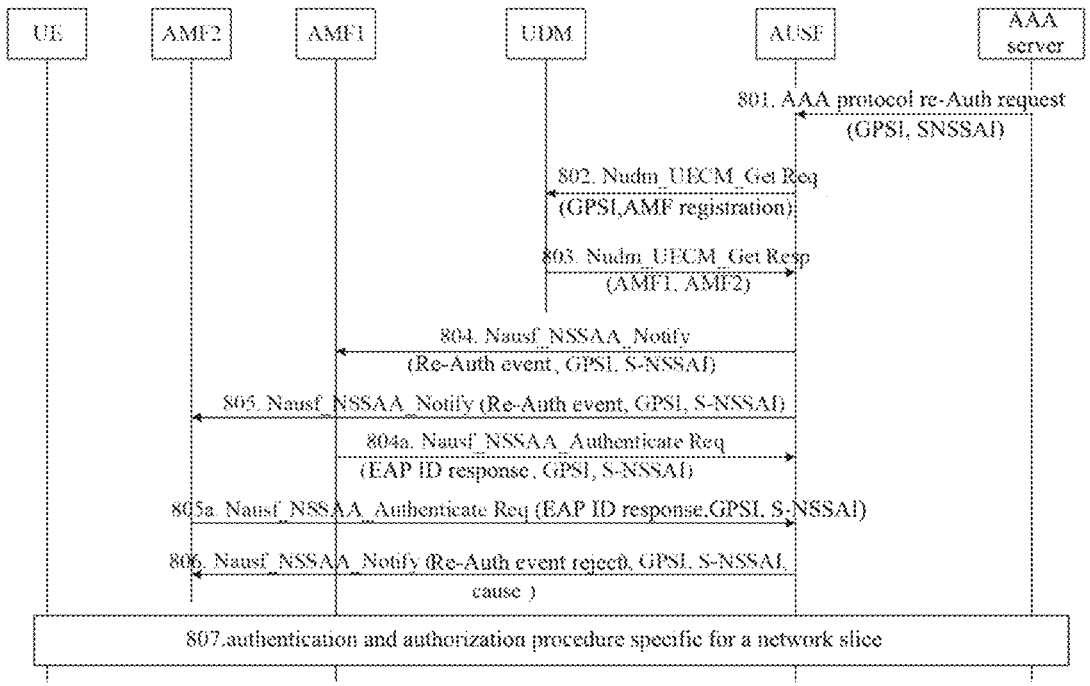
FIG. 8 is a schematic view showing the authentication and authorization procedure specific for the network slice initiated by the AAA server according to one embodiment of the present disclosure.

FIG. 8 shows an authentication and authorization procedure specific for a network slice initiated by the AAA server according to one embodiment of the present disclosure. In this procedure, the UDM returns two AMF IDs to the AUSF, and the AUSF transmits an authentication and authorization notification to two AMFs simultaneously. When the AMF has received the authentication and authorization notification and the AMF does not need to request an ID of a UE, as shown in FIG. 8, the procedure includes the following steps.

Step 801: the AAA server (AAA-S) transmits an AAA protocol re-authentication request (AAA Protocol Re-Auth Request) carrying the GPSI and the S-NSSAI to request the UE identified by the GPSI to perform the re-authentication and re-authorization on the network slice identified by the S-NSSAI. When an AAA proxy (AAA-P) has been deployed, the request is transmitted to the AAA proxy, otherwise it is directly transmitted to the AUSF. When the AAA proxy has been deployed, the AAA proxy forwards the message to the AUSF.

Steps 802 and 803: the AUSF obtains the AMF ID from the UDM through Nudm_UECM_Get. Information about two AMFs has been stored in the UDM, so the UDM returns the identification information about the two AMFs, i.e., AMF1 and AMF2, to the AUSF through Nudm_UECM_Get Resp.

In the above embodiments of the present disclosure, when the AUSF provides the S-NSSAI in Step 802, the UDM returns in Step 803 the AMF whose Allowed NSSAI includes the S-NSSAI. UDM may obtain Allowed NSSAI from the AMF.

Step 804: the AUSF transmits a re-authentication event to the AMF1.

To be specific, the AUSF transmits Nausf_NSSAA_Notify to the AMF1, and the message carries the Re-Auth event, the GPSI and the S-NSSAI.

Step 805: the AUSF transmits the re-authentication event to the AMF2.

To be specific, the AUSF transmits Nausf_NSSAA_Notify to the AMF2, and the message carries the Re-Auth event, the GPSI and the S-NSSAI.

Steps 804a and 805a: the AMF1 and the AMF2 transmit a Nausf_NSSAA_Authenticate request to the AMF1 and the AMF2 respectively, and the message includes an EAP ID response, the GPSI and the S-NSSAI. The AUSF selects the AMF1 to continue to execute the authentication and authorization procedure.

Step 806: the AUSF transmits a re-authentication reject notification message to the AMF2, and returns a reject cause to the AMF2, so as to indicate that the authentication and authorization procedure is currently being performed through the other AMF(s).

Step 807: the authentication and authorization procedure is performed through the AMF1.

Figure 9:
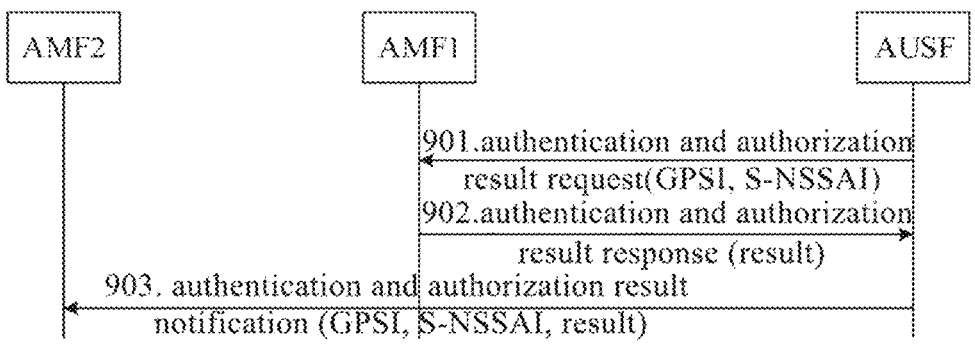
FIG. 9 is a schematic view showing a procedure of transmitting, by an AUSF, an authentication and authorization result to an AMF according to one embodiment of the present disclosure.

FIG. 9 shows a situation where the AUSF further obtains the authentication and authorization result from the AMF1 and notifies it to the AMF2. As shown in FIG. 9, the procedure includes the following steps.

Step 901: the AUSF transmits an authentication and authorization result request carrying the GPSI and the S-NSSAI to the AMF1, so as to request an authentication and authorization result of the S-NSSAI from the AMF1.

Step 902: the AMF1 transmits an authentication and authorization result response to the AUSF to return the authentication and authorization result of the S-NSSAI.

Step 903: the AUSF transmits an authentication and authorization result notification carrying the GPSI, the S-NSSAI and the authentication and authorization result to the AMF2, so as to transmit the authentication and authorization result of the S-NSSAI to the AMF2.

Figure 10:
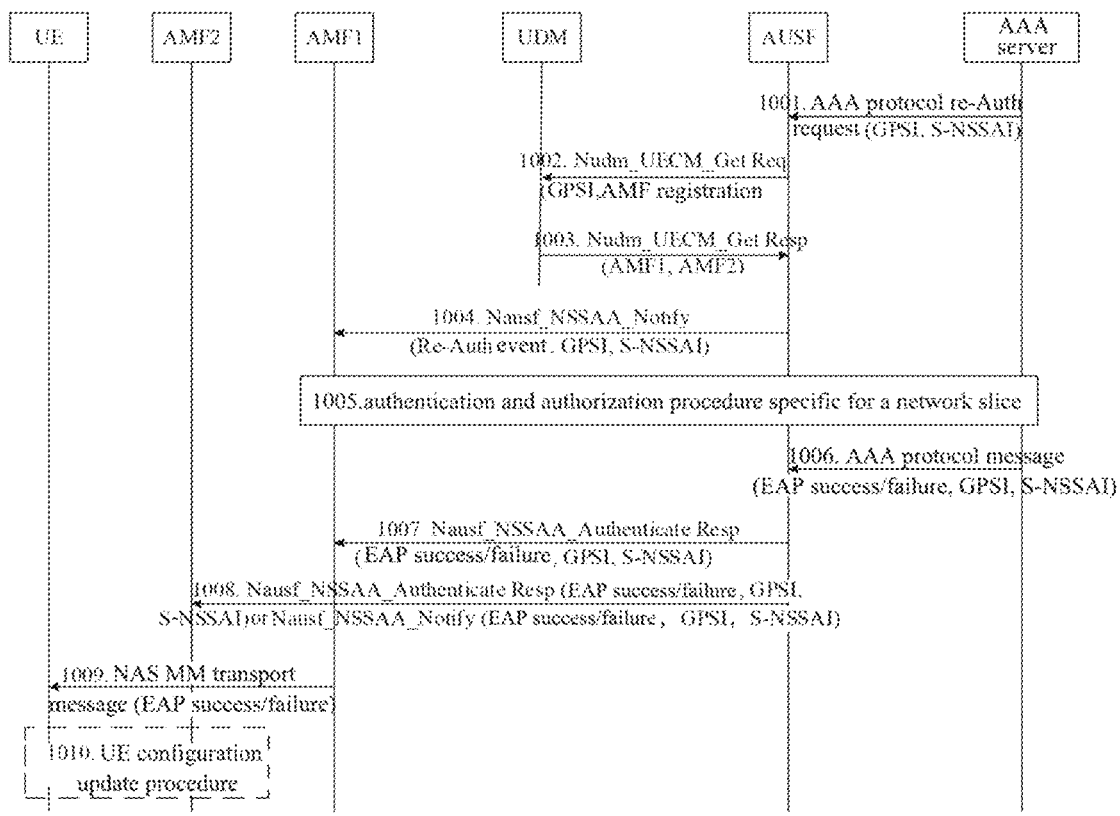
FIG. 10 is a schematic view showing the authentication and authorization procedure specific for the network slice initiated by the AAA server according to one embodiment of the present disclosure.

FIG. 10 shows an authentication and authorization procedure specific for a network slice initiated by the AAA server according to one embodiment of the present disclosure. In this procedure, the AUSF obtains two AMF IDs from the UDM, and transmits an authentication and authorization request to one AMF. The AUSF may randomly select one AMF, or further obtain the information about the UE (e.g., an access network for the UE and connection statuses in different access networks) from the UDM and then select an AMF in accordance with the information.

During the authentication and authorization, the AUSF takes charge of forwarding an EAP message between the AMF and the AAA-S/AAA-P. When the AUSF finds that the EAP message transmitted by the AAA-S/AAA-P is EAP success/EAP failure, the AUSF transmits an EAP success/ EAP failure message to the two AMFs simultaneously. As shown in FIG. 10, a specific procedure includes the following steps.

Step 1001: the AAA server (AAA-S) transmits an AAA protocol re-authentication request (AAA Protocol Re-Auth Request) carrying the GPSI and the S-NSSAI, so as to request a UE identified by the GPSI to perform the re-authentication and re-authorization on the network slice identified by the S-NSSAI. When an AAA proxy (AAA-P) has been deployed, the request is transmitted to the AAA proxy, otherwise, it is directly transmitted to the AUSF. When the AAA proxy has been deployed, the AAA proxy forwards the message to the AUSF.

Steps 1002 and 1003: the AUSF obtains the AMF ID from the UDM through Nudm_UECM_Get. Information about two AMFs has been stored in the UDM, so the UDM returns the identification information about the two AMFs, i.e., AMF1 and AMF2, to the AUSF through Nudm_UECM_Get Resp.

Step 1004: the AUSF selects one AMF from the AMF1 and the AMF2 (it is presumed that the AMF1 is selected by the AUSF in this embodiment of the present disclosure), and transmits Nausf_NSSAA_Notify carrying a Re-Auth event, the GPSI and the S-NSSAI to the AMF.

The AUSF may randomly select the AMF, or obtain from the UDM an access network to which the UE accesses and connection statuses of the UE in different access networks, and then select the AMF in accordance with the information.

Step 1005: performing the authentication and authorization procedure specific for the network splice. The procedure specifically includes the following steps.

(1) The AMF1 transmits an NAS mobility management transport message to the UE, and the message includes an EAP ID request and the S-NSSAI.

(2) The UE returns the NAS mobility management transport message to the AMF1, and the message includes an EAP ID response and the S-NSSAI.

(3) The AMF1 transmits an Nausf_NSSAA_Authenticate (the EAP ID response, an AAA server address, the GPSI and the S-NSSAI) to the AUSF.

(4) The AUSF encapsulates an EAP ID response message, the GPSI and the S-NSSAI with an AAA protocol message supported by the AAA server, and transmits the AAA protocol message to the AAA server.

(5) The AAA server stores the GPSI, and creates an association between the GPSI and an EAP ID in the EAP ID response message. Hence, the AAA server may cancel the authentication or trigger the re-authentication in accordance with association.

The AAA server transmits an AAA protocol message to the AUSF, and the message carries an EAP msg, the GPSI and the S-NSSAI.

(6) The AUSF transmits Nausf_NSSAA_Authenticate Resp carrying the EAP msg, the GPSI and the S-NSSAI to the AMF1.

(7) The AMF1 transmits NAS MM Transport (EAP msg and S-NSSAI) to the UE.

(8) The UE transmits NAS MM Transport (EAP msg and S-NSSAI) to the AMF1.

(9) The AMF1 transmits Nausf_NSSAA_Authenticate Request (EAP msg, GPSI and S-NSSAI) to the AUSF.

(10) The AUSF transmits an AAA Protocol message (EAP msg, GPSI and S-NSSAI) to the AAA server.

(11) The EAP authentication has been completed. The AAA server stores the S-NSSAI which has already been authorized, and the AAA-S may decide to trigger the re-authentication and re-authorization through a local policy. The AAA server transmits an EAP success/failure message, the GPSI and the S-NSSAI to the AUSF.

Step 1006: the AAA-S transmits the AAA protocol message to the AUSF, and the message carries the EAP success/ failure, the GPSI and the S-NSSAI.

Step 1007: the AUSF transmits Nausf_NSSAA_Authenticate Resp carrying the EAP success/failure, the GPSI and the S-NSSAI to the AMF1.

Step 1008: the AUSF finds that the EAP message received in Step 1006 is the EAP success/failure message, and transmits Nausf_NSSAA_Authenticate Resp carrying the EAP success/failure, the GPSI and the S-NSSAI, or Nausf_NSSAA_Notify carrying the EAP success/failure, the GPSI and the S-NSSAI, to the AMF2.

Step 1009: the AMF1 transmits an NAS MM transport message to the UE, and the message carries the EAP success/failure.

Step 1010: the AMF2 determines whether an authentication result is the same as a currently-stored authentication result of the S-NSSAI in accordance with the received EAP message. If yes, the AMF2 does not perform any operation, and if not, the AMF2 transmits a UE configuration update procedure to the UE so as to update the Allowed NSSAI of the UE.

Figure 11:
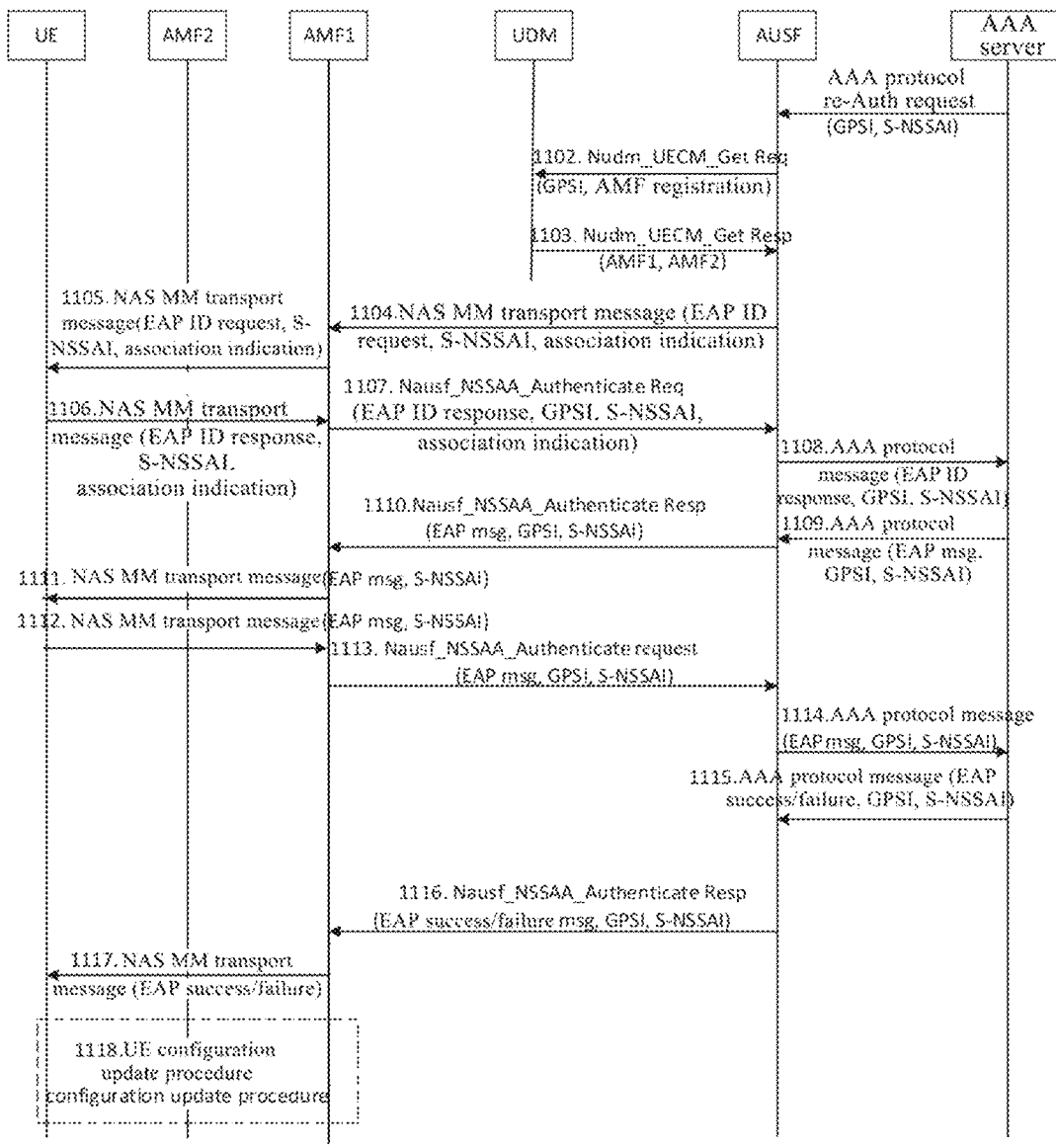
FIG. 11 is a schematic view showing the authentication and authorization procedure specific for the network slice initiated by the AAA server according to one embodiment of the present disclosure.

FIG. 11 shows an authentication and authorization procedure specific for a network slice initiated by the AAA server according to one embodiment of the present disclosure. In this procedure, the AUSF obtains two AMF IDs from the UDM, and transmits the authentication and authorization requests to the two AMFs simultaneously. An association indication is carried in the message. Upon the receipt of the messages carrying the association indication, the UE processes the two messages, and returns a response. The AMF transmits the response and the association indication from the UE to the AUSF. Upon the receipt of the messages having the association indication, the AUSF discards/ignores one message, and transmits the other message to the AAA-P or AAA-S. As shown in FIG. 11, a specific procedure includes the following steps.

Step 1101: the AAA server (AAA-S) transmits an AAA protocol re-authentication request (AAA Protocol Re-Auth Request) carrying the GPSI and the S-NSSAI, so as to request a UE identified by the GPSI to perform the re-authentication and re-authorization on the network slice identified by the S-NSSAI. When an AAA proxy (AAA-P) has been deployed, the request is transmitted to the AAA proxy, otherwise, it is directly transmitted to the AUSF. When the AAA proxy has been deployed, the AAA proxy forwards the message to the AUSF.

Steps 1102 and 1103: the AUSF obtains the AMF ID from the UDM through Nudm_UECM_Get. Information about two AMFs has been stored in the UDM, so the UDM returns the identification information about the two AMFs, i.e., AMF1 and AMF2, to the AUSF through Nudm_UECM_Get Resp.

Step 1104: the AUSF transmits Nausf_NSSAA_Notify carrying a re-authentication event, the GPSI, the S-NSSAI and the indication to the AMF1 and the AMF2.

Step 1105: the AMF transmits an NAS MM Transport message (EAP ID request, S-NSSAI and indication) to the UE, and the message includes the WAP ID request, the S-NSSAI and the indication. In FIG. 11, the AMF1 is taken as an example, and a processing mode of the AMF2 is the same as that of the AMF1.

Step 1106: the UE returns the NAS MM Transport message (EAP ID response, S-NSSAI and indication) to the AMF, and the message includes the EAP ID response, the S-NSSAI and the indication.

Upon the receipt of the messages having the association indication, the UE may process one message, and discard/ignore the other message.

Step 1107: the AMF1 transmits an Nausf_NSSAA_Authenticate request to the AUSF, and the message carries the EAP ID response, the AAA server address, the GPSI, the S-NSSAI and the indication.

Step 1108: the AUSF transmits a message to the AAA server in accordance with the response from one of the AMF1 and the AMF2, and ignores or discards the response from the other one of the AMF1 and the AMF2.

When the AAA proxy (AAA-P) has been deployed, the AUSF transmits the EAP ID response, the GPSI and the S-NSSAI to the AAA proxy, otherwise it directly transmits the message to the AAA server. The AUSF encapsulates the EAP ID response, the GPSI and the S-NSSAI with the AAA protocol message supported by the AAA proxy or AAA server, and transmits the AAA protocol message to the AAA server or AAA proxy.

Step 1109: the AAA server stores the GPSI, and creates an association between the GPSI and the EAP ID in the EAP ID response. Hence, the AAA server may cancel the authentication or trigger the re-authentication through the association.

The AAA server transmits the AAA protocol message to the AUSF, and the message carries the EAP msg, the GPSI and the S-NSSAI.

Step 1110: the AUSF transmits Nausf_NSSAA_Authenticate Resp carrying the EAP msg, the GPSI and the S-NSSAI to the AMF1.

Step 1111: the AMF1 transmits NAS MM Transport (EAP msg and S-NSSAI) to the UE.

Step 1112: the UE transmits NAS MM Transport (EAP msg and S-NSSAI) to the AMF1.

Step 1113: the AMF1 transmits Nausf_NSSAA_Authenticate Request (EAP msg, GPSI and S-NSSAI) to the AUSF.

Step 1114: the AUSF transmits the AAA protocol message (EAP msg, GPSI and S-NSSAI) to the AAA server.

Step 1115: the EAP authentication has been completed. The AAA server stores the S-NSSAI which has already been authorized, and the AAA-S may decide to trigger the re-authentication and re-authorization through a local policy. The AAA server transmits the EAP success/failure message, the GPSI and the S-NSSAI to the AUSF.

Step 1116: the AUSF transmits an Nausf_NSSAA_Authenticate response (EAP success/failure, S-NSSAI and GPSI) to the AMF.

Step 1117: the AMF transmits the NAS mobility management transport message (EAP success/failure) to the UE.

Step 1118: when the Allowed NSSAI or rejected S-NSSAI needs to be updated, the AMF initiates an UE configuration update procedure.

Figure 12:
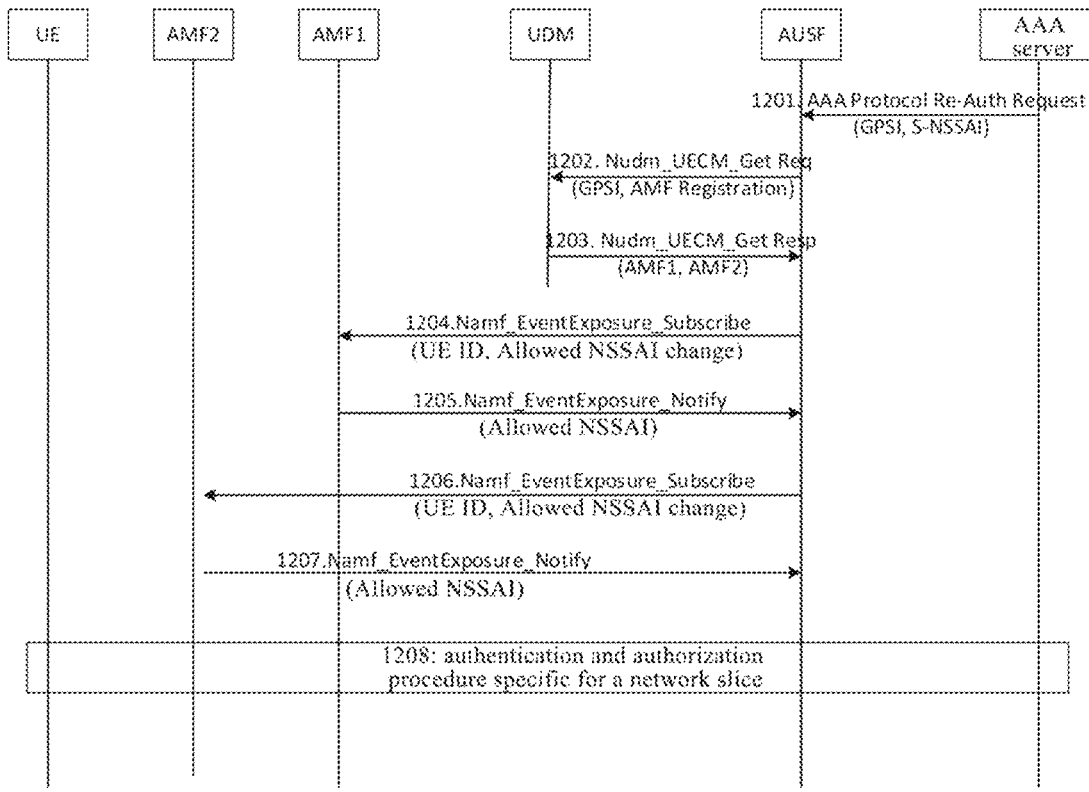
FIG. 12 is a schematic view showing an authentication and authorization procedure specific for the network slice triggered by the AUSF according to one embodiment of the present disclosure.

FIG. 12 shows an authentication and authorization procedure specific for a network slice initiated by the AAA server according to one embodiment of the present disclosure. In this procedure, the AUSF obtains the Allowed NSSAI from the AMF, and then triggers the authentication and authorization procedure specific for the network slice.

Step 1201: the AAA server (AAA-S) transmits an AAA protocol re-authentication request (AAA Protocol Re-Auth Request) carrying the GPSI and the S-NSSAI, so as to request a UE identified by the GPSI to perform the re-authentication and re-authorization on the network slice identified by the S-NSSAI. When an AAA proxy (AAA-P) has been deployed, the request is transmitted to the AAA proxy, otherwise, it is directly transmitted to the AUSF. When the AAA proxy has been deployed, the AAA proxy forwards the message to the AUSF.

Steps 1202 and 1203: the AUSF obtains the AMF ID from the UDM through Nudm_UECM_Get. Information about two AMFs has been stored in the UDM, so the UDM returns the identification information about the two AMFs, i.e., AMF1 and AMF2, to the AUSF through Nudm_UECM_Get Resp.

Steps 1204 and 1205: the AUSF obtains the Allowed NSSAI assigned by the AMF1 for the UE from the AMF1.

Steps 1206 and 1207: the AUSF obtains the Allowed NSSAI assigned by the AMF2 for the UE from the AMF2.

Step 1208: the AUSF initiates the authentication and authorization procedure.

This step may refer to Steps 1101 to 1118 in FIG. 11, or Steps 704 to 706a in FIG. 7.

In the embodiments of the present disclosure, the AUSF further obtains such information as an access type of the UE and a connection status of the UE from the AMF, and correspondingly, the AUSF selects the AMF in accordance with the Allowed NSSAI, the access type and the connection status.

Based on the above, according to the embodiments of the present disclosure, it is able to solve the problem in the related art where the network slice authentication and authorization mechanism does not support a scenario where the UE is provided with a plurality of service management function entities, thereby to ensure an authentication success rate.

Figure 13:
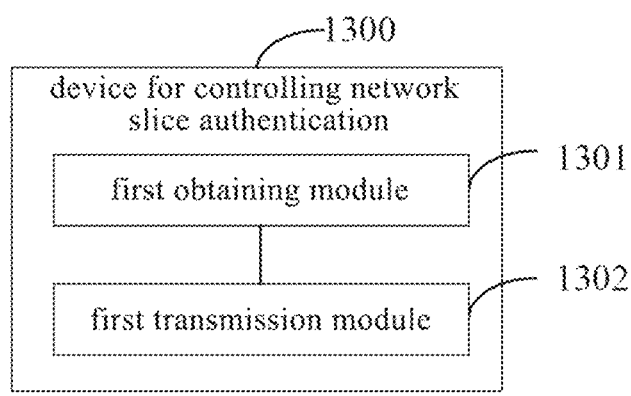
FIG. 13 is a schematic view showing a device for controlling network slice authentication according to one embodiment of the present disclosure.

The present disclosure further provides in some embodiments a device for controlling network slice authentication for a first network element. The first network element includes an AUSF. FIG. 13 shows the device for controlling network slice authentication. A principle of the device for controlling network slice authentication for solving the problem is similar to that of the above-mentioned method, so the implementation of the device for controlling network slice authentication may refer to that of the method, which will thus not be particularly defined herein.

As shown in FIG. 13, the device 1300 for controlling network slice authentication includes: a first obtaining module 1301 configured to obtain identification information about a third network element from a second network element; and a first transmission module 1302 configured to transmit an authentication and authorization notification to the third network element in accordance with the identification information.

In some possible embodiments of the present disclosure, the identification information includes Allowed NSSAI and an ID of the third network element, and the authentication and authorization notification carries S-NSSAI to be authorized and authenticated. The first transmission module 1302 includes: a first determination sub-module configured to determine a first target third network element, the S-NSSAI to be authorized and authenticated being located in Allowed NSSAI of the first target network element; and a first transmission sub-module configured to transmit the authentication and authorization notification to the first target third network element.

In some possible embodiments of the present disclosure, the identification information includes an ID of the third network element. The first transmission module 1302 further includes: a second transmission sub-module configured to request Allowed NSSAI assigned by the third network element with the ID for a UE from the third network element with the ID; a second determination sub-module configured to determine a second target third network element in accordance with the Allowed NSSAI from the third network element with the ID, S-NSSAI to be authorized and authenticated being located in Allowed NSSAI of the second target third network element; and a third transmission sub-module configured to transmit the authentication and authorization notification to the second target third network element.

In some possible embodiments of the present disclosure, the identification information includes an ID of the third network element. The device further includes a second transmission module configured to transmit first target S-NSSAI to the second network element. The first obtaining module 1301 is further configured to obtain IDs of one or more third network elements from the second network element, and the first target S-NSSAI is located in Allowed NSSAI of the one or more third network elements. The first transmission module 1302 is further configured to transmit the authentication and authorization notification to at least one third network element in the one or more third network elements in accordance with the ID of the third network element.

In some possible embodiments of the present disclosure, the device further includes a third transmission module configured to, when there are two or more third network elements and a reject message has been received from a second target third network element, transmit the authentication and authorization notification result to the other third network elements in the two or more third network elements, and the second target third network element is any third network element in the two or more third network elements.

In some possible embodiments of the present disclosure, the device further includes a fourth transmission module configured to, when an EAP message and S-NSSAI have been received from two or more third network elements and the two or more third network elements provide same S-NSSAI, select a third network element from the two or more third network elements to initiate an authentication procedure, and transmit a reject message to the other third network element in the two or more third network elements.

In some possible embodiments of the present disclosure, the device further includes a first reception module configured to, when there are two or more third network elements, receive a reject message from a second target third network element, the reject message is used to indicate that the authentication and authorization procedure is currently being performed between the UE and the other third network element in the two or more third network elements, and the second target third network element is any third network element in the third network elements.

In some possible embodiments of the present disclosure, the device further includes a fifth transmission module configured to, when there are two or more third network elements, obtain an authentication and authorization result from a third target third network element in the two or more third network elements, and transmit the authentication and authorization result to the other third network element in the two or more third network elements. The third target third network element is any third network element in the third network elements.

In some possible embodiments of the present disclosure, when there are two or more third network elements, the first transmission module 1302 includes: a first selection sub-module configured to select a fourth target third network element from the two or more third network elements in accordance with the identification information; and a first transmission sub-module configured to transmit the authentication and authorization notification to the fourth target third network element.

In some possible embodiments of the present disclosure, the first selection sub-module is specifically configured to select one third network element from the two or more third network elements as the fourth target third network element, or obtain information about the UE from the second network element and select one third network element from the two or more third network elements as the fourth target third network element in accordance with the information about the UE.

In some possible embodiments of the present disclosure, the device further includes: a second reception module configured to receive a first message from a fourth network element, the first message carrying EAP success or EAP failure; a sixth transmission module configured to transmit a second message to the fourth target third network element, the second message carrying the EAP success or EAP failure; and a seventh transmission module configured to transmit a third message to a fifth target third network element, the third message carrying the EAP success or EAP failure, the fifth target third network element being a third network element in the two or more third network elements other than the fourth target third network element.

In some possible embodiments of the present disclosure, when there are two or more third network elements, the authentication and authorization notification carries a first indicator. The device further includes: a third reception module configured to receive fourth messages from the two or more third network elements, each fourth message carrying the first indicator; and an eighth transmission module configured to transmit a fifth message to a fourth network element in accordance with the fourth message from one third network element in the two or more third network elements, and ignore or discard the fourth messages from the other third network elements in the two or more third network elements.

The device in the embodiments of the present disclosure is used to implement the above-mentioned method with a similar principle and a similar technical effect, and thus will not be particularly defined herein.

Figure 14:
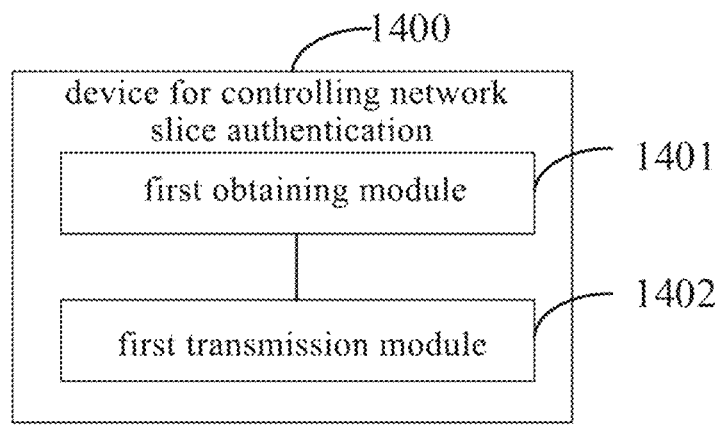
FIG. 14 is another schematic view showing the device for controlling network slice authentication according to one embodiment of the present disclosure.

The present disclosure further provides in some embodiments a device for controlling network slice authentication for a second network element. The second network element includes a UDM. FIG. 14 shows the device for controlling network slice authentication. A principle of the device for controlling network slice authentication for solving the problem is similar to that of the above-mentioned method, so the implementation of the device for controlling network slice authentication may refer to that of the method, which will thus not be particularly defined herein.

As shown in FIG. 14, the device 1400 for controlling network slice authentication includes: a first obtaining module 1401 configured to obtain identification information about at least two third network elements; and a first transmission module 1402 configured to transmit the identification information about a target third network element to a first network element, the target third network element being one or more third network elements in the at least two third network elements.

In some possible embodiments of the present disclosure, the identification information includes an ID of the third network element, or includes Allowed NSSAI and the ID of the third network element.

In some possible embodiments of the present disclosure, the device further includes: a first reception module configured to receive first target S-NSSAI from the first network element; and a second transmission module configured to select the target third network element from the two or more third network elements in accordance with the first target S-NSSAI, and transmit an ID of the target third network element to the first network element, the first target S-NSSAI being located in Allowed NSSAI of the target third network element.

In some possible embodiments of the present disclosure, the device further incudes a third transmission module configured to transmit information about a UE to the first network element.

The device in the embodiments of the present disclosure is used to implement the above-mentioned method with a similar principle and a similar technical effect, and thus will not be particularly defined herein.

Figure 15:
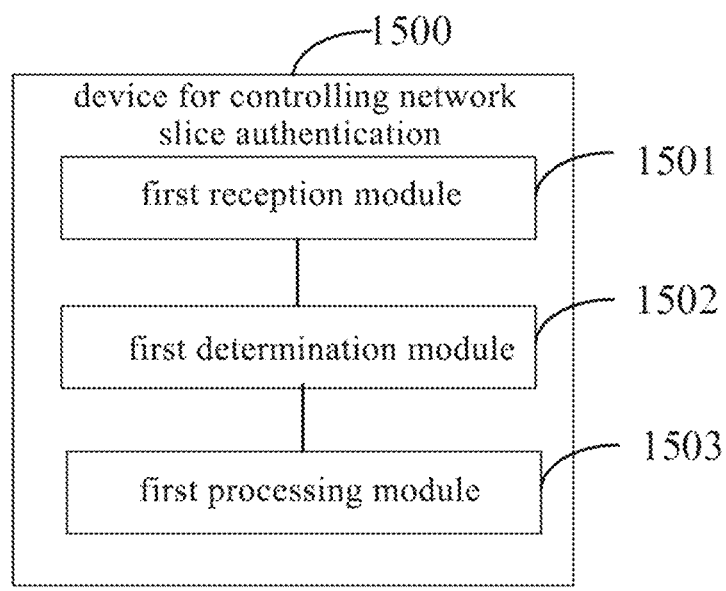
FIG. 15 is yet another schematic view showing the device for controlling network slice authentication according to one embodiment of the present disclosure.

The present disclosure further provides in some embodiments a device for controlling network slice authentication for a third network element. FIG. 15 shows the device for controlling network slice authentication. A principle of the device for controlling network slice authentication for solving the problem is similar to that of the above-mentioned method, so the implementation of the device for controlling network slice authentication may refer to that of the method, which will thus not be particularly defined herein.

As shown in FIG. 15, the device 1500 for controlling network slice authentication includes: a first reception module 1501 configured to receive an authentication and authorization notification from a first network element, the authentication and authorization notification carrying second target S-NSSAI; a first determination module 1502 configured to determine whether the second target S-NSSAI belongs to Allowed NSSAI of a UE to obtain a determination result; and a first processing module 1503 configured to perform processing in accordance with the determination result.

In some possible embodiments of the present disclosure, the first processing module 1503 includes: a first processing sub-module configured to, when the determination result indicates that the second target S-NSSAI does not belong to the Allowed NSSAI of the UE, transmit a reject message to the first network element; and when the determination result indicates that the second target S-NSSAI belongs to the Allowed NSSAI of the UE, perform any of the followings: executing an authentication and authorization procedure specific for a network slice, transmitting an EAP message to the UE, and transmitting the EAP message to the first network element.

In some possible embodiments of the present disclosure, the device further includes a second reception module configured to receive a reject message from the UE, and transmit the reject message to the first network element.

In some possible embodiments of the present disclosure, the device further includes a third reception module configured to receive an authentication and authorization result from the first network element.

In some possible embodiments of the present disclosure, the device further includes a fourth reception module configured to receive an authentication and authorization result from a fourth network element.

In some possible embodiments of the present disclosure, the device further includes: a fifth reception module configured to receive a second message from the first network element, the second message carrying EAP success or EAP failure; and a second transmission module configured to transmit a sixth message to the UE, the sixth message carrying the EAP success or the EAP failure.

In some possible embodiments of the present disclosure, the device further includes: a sixth reception module configured to receive a third message from the first network element, the third message carrying EAP success or EAP failure; and a second transmission module configured to transmit a configuration update procedure to the UE in accordance with the third message.

In some possible embodiments of the present disclosure, the authentication and authorization notification carries a first indicator. The device further includes: a third transmission module configured to transmit a seventh message to the UE, the seventh message carrying the first indicator; a seventh reception module configured to receive an eighth message from the UE, the eighth message carrying the first indicator; and a fourth transmission module configured to transmit a fourth message to the first network element in accordance with the eighth message, the fourth message carrying the first indicator.

In some possible embodiments of the present disclosure, the device further includes: a seventh reception module configured to receive a request from the first network element; and an eighth transmission module configured to transmit Allowed NSSAI to the first network element in accordance with the request.

The device in the embodiments of the present disclosure is used to implement the above-mentioned method with a similar principle and a similar technical effect, and thus will not be particularly defined herein.

Figure 16:
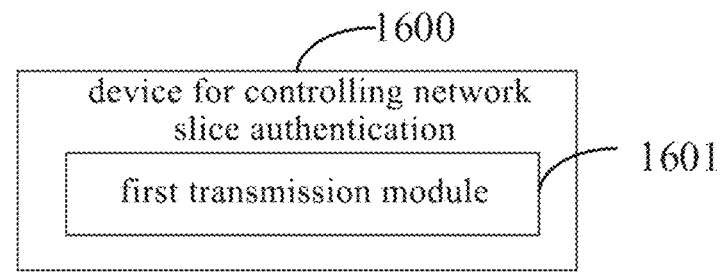
FIG. 16 is still yet another schematic view showing the device for controlling network slice authentication according to one embodiment of the present disclosure.

The present disclosure further provides in some embodiments a device for controlling network slice authentication for a fourth network element. FIG. 16 shows the device for controlling network slice authentication. A principle of the device for controlling network slice authentication for solving the problem is similar to that of the above-mentioned method, so the implementation of the device for controlling network slice authentication may refer to that of the method, which will thus not be particularly defined herein.

As shown in FIG. 16, the device 1600 for controlling network slice authentication includes a first transmission module 1601 configured to, when an authentication and authorization procedure specific for a network slice is triggered by a third network element and an authentication and authorization result for S-NSSAI requested by the third network element has been stored, directly return the authentication and authorization result.

In some possible embodiments of the present disclosure, the device further includes: a second transmission module configured to transmit a first message to a first network element, the first message carrying EAP success or EAP failure; or a first reception module configured to receive a fifth message from the first network element, the fifth message being transmitted by the first network element in accordance with a fourth message from one third network element in two or more third network elements when the first messages have been received from the two or more third network elements and each first message carries a first indicator, the fourth message from the other third network element in the two or more third network elements being ignored or discarded by the first network element.

The device in the embodiments of the present disclosure is used to implement the above-mentioned method with a similar principle and a similar technical effect, and thus will not be particularly defined herein.

Figure 17:
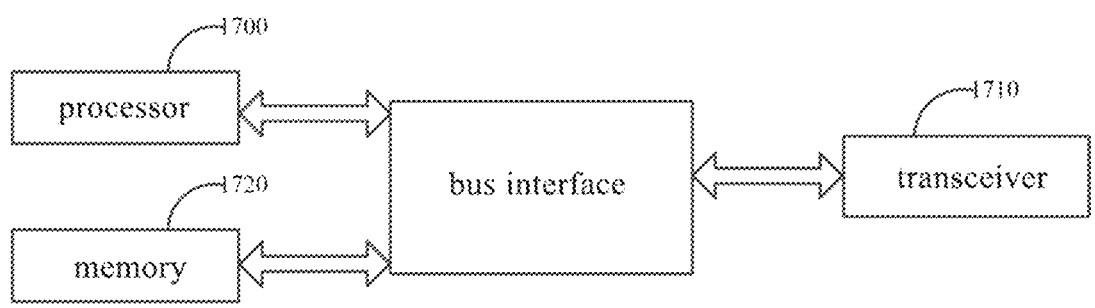
FIG. 17 is a schematic view showing an apparatus for controlling network slice authentication according to one embodiment of the present disclosure.

As shown in FIG. 17, the present disclosure provides in some embodiments an apparatus for controlling network slice authentication, which includes: a processor 1700 configured to read a program in a memory 1720 so as to obtain identification information about a third network element from a second network element and transmit an authentication and authorization notification to the third network element in accordance with the identification information; and a transceiver 1710 configured to receive and transmit data under the control of the processor 1700.

In FIG. 17, bus architecture may include a number of buses and bridges connected to each other, so as to connect various circuits for one or more processors 1700 and one or more memories 1720. In addition, as is known in the art, the bus architecture may be used to connect any other circuits, such as a circuit for a peripheral device, a circuit for a voltage stabilizer and a power management circuit. A bus interface may be provided, and the transceiver 1710 may consist of a plurality of elements, i.e., a transmitter and a receiver for communication with any other devices over a transmission medium.

The processor 1700 may take charge of managing the bus architecture as well as general processings. The memory 1720 may store therein data for the operation of the processor 1700.

In some possible embodiments of the present disclosure, the identification information includes Allowed NSSAI and an ID of the third network element, and the authentication and authorization notification carries S-NSSAI to be authorized and authenticated. The processor 1700 is further configured to read the program in the memory, so as to: determine a first target third network element, the S-NSSAI to be authorized and authenticated being located in Allowed NSSAI of the first target network element; and transmit the authentication and authorization notification to the first target third network element.

In some possible embodiments of the present disclosure, the identification information includes an ID of the third network element. The processor 1700 is further configured to read the program in the memory, so as to: transmit first target S-NSSAI to the second network element; obtain IDs of one or more third network elements from the second network element, the first target S-NSSAI being located in Allowed NSSAI of the one or more third network elements.

In some possible embodiments of the present disclosure, the identification information includes an ID of the third network element. The processor 1700 is further configured to read the program in the memory, so as to: request Allowed NSSAI assigned by the third network element with the ID for a UE from the third network element with the ID; determine a second target third network element in accordance with the Allowed NSSAI from the third network element with the ID, S-NSSAI to be authorized and authenticated being located in Allowed NSSAI of the second target third network element; and transmit the authentication and authorization notification to the second target third network element.

In some possible embodiments of the present disclosure, the processor 1700 is further configured to read the program in the memory, so as to, when there are two or more third network elements, obtain an authentication and authorization result from a third target third network element in the two or more third network elements, and transmit the authentication and authorization notification result to the other third network elements in the two or more third network elements, and the third target third network element is any third network element in the two or more third network elements.

In some possible embodiments of the present disclosure, the processor 1700 is further configured to read the program, so as to, when there are two or more third network elements, an EAP message and S-NSSAI have been received from two or more third network elements and the two or more third network elements provide same S-NSSAI, select a third network element from the two or more third network elements to initiate an authentication procedure, and transmit a reject message to the other third network element in the two or more third network elements.

In some possible embodiments of the present disclosure, the processor 1700 is further configured to read the program, so as to, when there are two or more third network elements, receive a reject message from a second target third network element, the reject message is used to indicate that the authentication and authorization procedure is currently being performed between the UE and the other third network element in the two or more third network elements, and the second target third network element is any third network element in the third network elements.

In some possible embodiments of the present disclosure, the processor 1700 is further configured to read the program, so as to, when there are two or more third network elements, obtain an authentication and authorization result from a third target third network element in the two or more third network elements, and transmit the authentication and authorization result to the other third network element in the two or more third network elements. The third target third network element is any third network element in the third network elements.

In some possible embodiments of the present disclosure, when there are two or more third network elements, the processor 1700 is further configured to read the program, so as to: select a fourth target third network element from the two or more third network elements in accordance with the identification information; and transmit the authentication and authorization notification to the fourth target third network element.

In some possible embodiments of the present disclosure, the processor 1700 is further configured to read the program, so as to randomly select one third network element from the two or more third network elements as the fourth target third network element, or obtain information about the UE from the second network element and select one third network element from the two or more third network elements as the fourth target third network element in accordance with the information about the UE.

In some possible embodiments of the present disclosure, the processor 1700 is further configured to read the program, so as to: receive a first message from a fourth network element, the first message carrying EAP success or EAP failure; transmit a second message to the fourth target third network element, the second message carrying the EAP success or EAP failure; and transmit a third message to a fifth target third network element, the third message carrying the EAP success or EAP failure, the fifth target third network element being a third network element in the two or more third network elements other than the fourth target third network element.

In some possible embodiments of the present disclosure, when there are two or more third network elements, the authentication and authorization notification carries a first indicator. The processor 1700 is further configured to read the program, so as to: receive fourth messages from the two or more third network elements, each fourth message carrying the first indicator; and transmit a fifth message to a fourth network element in accordance with the fourth message from one third network element in the two or more third network elements, and ignore or discard the fourth messages from the other third network elements in the two or more third network elements.

The device may be applied to a first network element, e.g., an AUSF.

The device in the embodiments of the present disclosure is used to implement the above-mentioned method with a similar principle and a similar technical effect, and thus will not be particularly defined herein.

Referring to FIG. 17 again, the present disclosure provides in some embodiments an apparatus for controlling network slice authentication, which includes: a processor 1700 configured to read a program in a memory 1720, so as to obtain identification information about at least two third network elements, and transmit identification about a target third network element to a first network element, the target third network element being one or more third network elements in the at least two third network elements; and a transceiver 1710 configured to receive and transmit data under the control of the processor 1700.

In FIG. 17, bus architecture may include a number of buses and bridges connected to each other, so as to connect various circuits for one or more processors 1700 and one or more memories 1720. In addition, as is known in the art, the bus architecture may be used to connect any other circuits, such as a circuit for a peripheral device, a circuit for a voltage stabilizer and a power management circuit. A bus interface may be provided, and the transceiver 1710 may consist of a plurality of elements, i.e., a transmitter and a receiver for communication with any other devices over a transmission medium.

The processor 1700 may take charge of managing the bus architecture as well as general processings. The memory 1720 may store therein data for the operation of the processor 1700.

In some possible embodiments of the present disclosure, the processor 1700 is further configured to read the program, so as to: receive first target S-NSSAI from the first network element; and select the target third network element from the two or more third network elements in accordance with the first target S-NSSAI, and transmit an ID of the target third network element to the first network element, the first target S-NSSAI being located in Allowed NSSAI of the target third network element.

In some possible embodiments of the present disclosure, the processor 1700 is further configured to read the program, so as to transmit information about a UE to the first network element.

The apparatus in the embodiments of the present disclosure is used to implement the above-mentioned method with a similar principle and a similar technical effect, and thus will not be particularly defined herein.

Referring to FIG. 17 again, the present disclosure further provides in some embodiments an apparatus for controlling network slice authentication, which includes: a processor 1700 configured to read a program in a memory 1720, so as to receive an authentication and authorization notification from a first network element, the authentication and authorization notification carrying second target S-NSSAI, determine whether the second target S-NSSAI belongs to Allowed NSSAI of a UE to obtain a determination result, and perform processing in accordance with the determination result; and a transceiver 1710 configured to receive transmit data under the control of the processor 1700.

In FIG. 17, bus architecture may include a number of buses and bridges connected to each other, so as to connect various circuits for one or more processors 1700 and one or more memories 1720. In addition, as is known in the art, the bus architecture may be used to connect any other circuits, such as a circuit for a peripheral device, a circuit for a voltage stabilizer and a power management circuit. A bus interface may be provided, and the transceiver 1710 may consist of a plurality of elements, i.e., a transmitter and a receiver for communication with any other devices over a transmission medium.

The processor 1700 may take charge of managing the bus architecture as well as general processings. The memory 1720 may store therein data for the operation of the processor 1700.

In some possible embodiments of the present disclosure, the processor 1700 is further configured to read the program, so as to: when the determination result indicates that the second target S-NSSAI does not belong to the Allowed NSSAI of the UE, transmit a reject message to the first network element; and when the determination result indicates that the second target S-NSSAI belongs to the Allowed NSSAI of the UE, perform any of the followings: executing an authentication and authorization procedure specific for a network slice, transmitting an EAP message to the UE, and transmitting the EAP message to the first network element.

In some possible embodiments of the present disclosure, the processor 1700 is further configured to read the program, so as to receive a reject message from the UE, and transmit the reject message to the first network element.

In some possible embodiments of the present disclosure, the processor 1700 is further configured to read the program, so as to receive an authentication and authorization result from the first network element.

In some possible embodiments of the present disclosure, the processor 1700 is further configured to read the program, so as to: receive a second message from the first network element, the second message carrying EAP success or EAP failure; and transmit a sixth message to the UE, the sixth message carrying the EAP success or the EAP failure.

In some possible embodiments of the present disclosure, the processor 1700 is further configured to read the program, so as to: receive a third message from the first network element, the third message carrying EAP success or EAP failure; and transmit a configuration update procedure to the UE in accordance with the third message.

In some possible embodiments of the present disclosure, a first indicator is carried in the authentication and authorization notification. The processor 1700 is further configured to read the program, so as to: transmit a seventh message to the UE, the seventh message carrying the first indicator; receive an eighth message from the UE, the eighth message carrying the first indicator; and transmit a fourth message to the first network element in accordance with the eighth message, the fourth message carrying the first indicator.

In some possible embodiments of the present disclosure, the processor 1700 is further configured to read the program, so as to: receive a request from the first network element; and transmit Allowed NSSAI to the first network element in accordance with the request.

The apparatus may be applied to a third network element, e.g., an AMF.

The apparatus in the embodiments of the present disclosure is used to implement the above-mentioned method with a similar principle and a similar technical effect, and thus will not be particularly defined herein.

Referring to FIG. 17 again, the present disclosure further provides in some embodiments an apparatus for controlling network slice authentication, which includes: a processor 1700 configured to read a program in a memory 1720, so as to, when an authentication and authorization procedure specific for a network slice is triggered by a third network element and an authentication and authorization result for S-NSSAI requested by the third network element has been stored, directly return the authentication and authorization result; and a transceiver 1710 configured to receive and transmit data under the control of the processor 1700.

In FIG. 17, bus architecture may include a number of buses and bridges connected to each other, so as to connect various circuits for one or more processors 1700 and one or more memories 1720. In addition, as is known in the art, the bus architecture may be used to connect any other circuits, such as a circuit for a peripheral device, a circuit for a voltage stabilizer and a power management circuit. A bus interface may be provided, and the transceiver 1710 may consist of a plurality of elements, i.e., a transmitter and a receiver for communication with any other devices over a transmission medium.

The processor 1700 may take charge of managing the bus architecture as well as general processings. The memory 1720 may store therein data for the operation of the processor 1700.

In some possible embodiments of the present disclosure, the processor 1700 is further configured to read the program, so as to: transmit a first message to a first network element, the first message carrying EAP success or EAP failure; or receive a fifth message from the first network element, the fifth message being transmitted by the first network element in accordance with a fourth message from one third network element in two or more third network elements when the first messages have been received from the two or more third network elements and each first message carries a first indicator, the fourth message from the other third network element in the two or more third network elements being ignored or discarded by the first network element.

The apparatus may be applied to a fourth network element, e.g., an AAA server.

The apparatus in the embodiments of the present disclosure is used to implement the above-mentioned method with a similar principle and a similar technical effect, and thus will not be particularly defined herein.

The present disclosure further provides in some embodiments a computer-readable storage medium storing therein a computer program. The computer program is executed by a processor, so as to implement the above-mentioned methods for controlling network slice authentication with a same technical effect, which will not be particularly defined herein. The computer-readable storage medium may be, e.g., a read-only memory (Read-Only Memory, ROM), a random access memory (Random Access Memory, RAM), a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

It should be further appreciated that, the above modules in the network device and the UE are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A or B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for controlling network slice authentication performed by a first network element, the first network element being an Authentication Function, the method comprising:
    obtaining identification information about a third network element from a second network element, the second network element being a Unified Data Management (UDM); and
    transmitting an authentication and authorization notification to the third network element in accordance with the identification information;
    wherein there are two or more third network elements, the transmitting the authentication and authorization notification to the third network element in accordance with the identification information comprises: selecting a fourth target third network element from the two or more third network elements in accordance with the identification information; and transmitting the authentication and authorization notification to the fourth target third network element;
    subsequent to transmitting the authentication and authorization notification to the fourth target third network element, the method further comprises: receiving a first message from a fourth network element, the fourth network element being an Authentication, Authorization and Accounting (AAA) server, the first message carrying Extensible Authentication Protocol (EAP) failure; transmitting a second message to the fourth target third network element, the second message carrying the EAP failure; and transmitting a third message to a fifth target third network element, the third message being a notification message, the fifth target third network element being a third network element in the two or more third network elements other than the fourth target third network element, wherein each of the two or more third network elements is an Access and Mobility Management Function (AMF).

2. The method according to claim 1, wherein the identification information comprises Allowed Network Slice Selection Assistance Information (NSSAI) and an Identifier (ID) of the third network element, and the authentication and authorization notification carries Single Network Slice Selection Assistance Information (S-NSSAI) to be authorized and authenticated,
    wherein the transmitting the authentication and authorization notification to the third network element in accordance with the identification information comprises: determining a first target third network element, the S-NSSAI to be authorized and authenticated being located in Allowed NSSAI of first target network element; and transmitting the authentication and authorization notification to the first target third network element.

3. The method according to claim 1, wherein the identification information comprises an ID of the third network element,
    wherein prior to obtaining the identification information about the third network element from the second network element, the method further comprises transmitting first target S-NSSAI to the second network element, the obtaining the identification information about the third network element from the second network element comprises obtaining IDs of one or more third network elements from the second network element, and the first target S-NSSAI is located in Allowed NSSAI of the one or more third network elements, wherein the transmitting the authentication and authorization notification to the third network element in accordance with the identification information comprises transmitting the authentication and authorization notification to at least one third network element in the one or more third network elements in accordance with the ID of the third network element; or
    wherein the identification information comprises the ID of the third network element, wherein the transmitting the authentication and authorization notification to the third network element in accordance with the identification information comprises: requesting Allowed NSSAI assigned by the third network element with an ID for a UE from the third network element with the ID of the third network element; determining a second target third network element in accordance with the Allowed NSSAI from the third network element with the ID of the third network element, S-NSSAI to be authorized and authenticated being located in Allowed NSSAI of the second target third network element; and transmitting the authentication and authorization notification to the second target third network element.

4. The method according to claim 1, wherein
the second network element obtains identification information about at least two third network elements; and
the second network element transmits identification information about a target third network element to a first network element, the target third network element being one or more third network elements in the at least two third network elements.

5. The method according to claim 4, wherein the identification information comprises an ID of the third network element, or comprises Allowed NSSAI and the ID of the third network element.

6. The method according to claim 5, wherein
the second network element receives first target S-NSSAI from the first network element; and
the second network element selects the target third network element from the two or more third network elements in accordance with the first target S-NSSAI, and transmits the ID of the target third network element to the first network element, the first target S-NSSAI being located in Allowed NSSAI of the target third network element.

7. An apparatus for controlling network slice authentication disposed at the UDM, the apparatus comprising a transceiver, a memory, a processor, and a program stored in the memory and executed by the processor, wherein the processor is configured to read the program in the memory, to direct the Authentication Function to perform the method according to claim 4.

8. The method according to claim 1, wherein the method further comprising:
receiving, by the AMF, the authentication and authorization notification from the first network element, the authentication and authorization notification carrying second target S-NSSAI;
determining, by the AMF, whether the second target S-NSSAI belongs to Allowed NSSAI of a User Equipment (UE) to obtain a determination result; and
performing, by the AMF, processing in accordance with the determination result,
wherein the performing, by the AMF, the processing in accordance with the determination result comprises:
when the determination result indicates that the second target S-NSSAI does not belong to the Allowed NSSAI of the UE, transmitting a reject message to the first network element; or
when the determination result indicates that the second target S-NSSAI belongs to the Allowed NSSAI of the UE, performing any of the followings: executing an authentication and authorization procedure specific for a network slice, transmitting an EAP message to the UE, or transmitting the EAP message to the first network element.

9. The method according to claim 8, further comprising:
receiving, by the AMF, a first authentication and authorization result from the first network element; or
receiving, by the AMF, a second authentication and authorization result from the fourth network element; or
receiving, by the AMF, the second message from the first network element, the second message carrying the EAP failure; and transmitting a sixth message tothe UE, the sixth message carrying the EAP failure; or
receiving, by the AMF, the third message from the first network element; and transmitting a configuration update procedure to the UE in accordance with the third message; or
the authentication and authorization notification carries a first indicator, transmitting a seventh message to the UE, the seventh message carrying the first indicator; receiving an eighth message from the UE, the eighth message carrying the first indicator; and transmitting a fourth message to the first network element in accordance with the eighth message, the fourth message carrying the first indicator; or
receiving a request from the first network element; and transmitting Allowed NSSAI to the first network element in accordance with the request.

10. The method according to claim 9, wherein subsequent to the receiving the second authentication and authorization result from the fourth network element,
when an authentication and authorization procedure specific for a network slice is triggered by the third network element and an authentication and authorization result for S-NSSAI requested by the third network element has been stored, the fourth network element directly returns the second authentication and authorization result.

11. The method according to claim 10, wherein
the fourth network element transmits the first message to the first network element, the first message carrying the EAP failure; or
the fourth network element receives a fifth message from the first network element, the fifth message being transmitted by the first network element in accordance with the fourth message from one third network element in two or more third network elements when the first messages have been received from the two or more third network elements and each first message carries the first indicator, the fourth message from other third network element in the two or more third network elements being ignored or discarded by the first network element.

12. An apparatus for controlling network slice authentication disposed at the AMF, the apparatus comprising a transceiver, a memory, a processor, and a program stored in the memory and executed by the processor, wherein the processor is configured to read the program in the memory, to direct the Authentication Function to perform the method according to claim 8.

13. An apparatus for controlling network slice authentication disposed at a first network element, the first network element being an Authentication Function, the apparatus comprising a transceiver, a memory, a processor, and a program stored in the memory and executed by the processor, wherein the processor is configured to read the program in the memory, so as to: obtain identification information about a third network element from a second network element, the second network element being a Unified Data Management (UDM); and transmit an authentication and authorization notification to the third network element in accordance with the identification information,
wherein the processor is further configured to read the program in the memory, so as to:

wherein there are two or more third network elements, the transmitting the authentication and authorization notification to the third network element in accordance with the identification information comprises: select a fourth target third network element from the two or more third network elements in accordance with the identification information; and transmit the authentication and authorization notification to the fourth target third network element;

subsequent to transmitting the authentication and authorization notification to the fourth target third network element, receive a first message from a fourth network element, the fourth network element being an Authentication, Authorization and Accounting (AAA) server, the first message carrying Extensible Authentication Protocol (EAP) failure; transmit a second message to the fourth target third network element, the second message carrying the EAP failure; and transmit a third message to a fifth target third network element, the third message being a notification message, the fifth target third network element being a third network element in the two or more third network elements other than the fourth target third network element, wherein each of the two or more third network elements is an Access and Mobility Management Function (AMF).

14. The apparatus according to claim 13, wherein the identification information comprises Allowed NSSAI and an ID of the third network element, and the authentication and authorization notification carries S-NSSAI to be authorized and authenticated, wherein the processor is further configured to read the program in the memory, so as to: determine a first target third network element, the S-NSSAI to be authorized and authenticated being located in Allowed NSSAI of first target network element; and transmit the authentication and authorization notification to the first target third network element.

15. The apparatus according to claim 13, wherein the identification information comprises an ID of the third network element, wherein the processor is further configured to read the program in the memory, so as to:

transmit first target S-NSSAI to the second network element; obtain IDs of one or more third network elements from the second network element, the first target S-NSSAI being located in Allowed NSSAI of the one or more third network elements; and transmit the authentication and authorization notification to at least one third network element in the one or more third network elements in accordance with the ID of the third network element, or request Allowed NSSAI assigned by the third network element with an ID for a UE from the third network element with the ID of the third network element; determine a second target third network element in accordance with the Allowed NSSAI from the third network element with the ID of the third network element, S-NSSAI to be authorized and authenticated being located in Allowed NSSAI of the second target third network element; and transmit the authentication and authorization notification to the second target third network element.

* * * * *